(12) United States Patent
Uchino

(10) Patent No.: US 10,788,925 B2
(45) Date of Patent: Sep. 29, 2020

(54) TOUCH PANEL SHARING SUPPORT APPARATUS, TOUCH PANEL SHARING METHOD, AND COMPUTER PROGRAM

(71) Applicant: Konica Minolta, Inc., Tokyo (JP)

(72) Inventor: Satoshi Uchino, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/222,164

(22) Filed: Dec. 17, 2018

(65) Prior Publication Data

US 2019/0187857 A1   Jun. 20, 2019

(30) Foreign Application Priority Data

Dec. 20, 2017   (JP) .................................. 2017-243508

(51) Int. Cl.
*G06F 3/041*   (2006.01)
*G06F 3/0488*   (2013.01)
(Continued)

(52) U.S. Cl.
CPC ........ *G06F 3/0416* (2013.01); *G06F 3/04886* (2013.01); *H04N 1/0097* (2013.01); *H04N 1/00244* (2013.01); *H04N 1/00392* (2013.01); *H04N 1/00474* (2013.01); *G06F 9/451* (2018.02); *G06F 2203/04104* (2013.01); *G06F 2203/04803* (2013.01); *G06F 2203/04808* (2013.01); *H04N 2201/0094* (2013.01)

(58) Field of Classification Search
CPC ....... H04N 2201/0094; H04N 1/00474; H04N 1/00244; H04N 1/00392; H04N 1/0097; G06F 2203/04808; G06F 3/04886; G06F 3/0416; G06F 9/451; G06F 2203/04104; G06F 2203/04803

See application file for complete search history.

(56) References Cited

U.S. PATENT DOCUMENTS

2012/0293433 A1* 11/2012 Yamamoto ............ G06F 3/0412
   345/173
2015/0121238 A1*  4/2015 Lee ........................ H04L 67/06
   715/738

(Continued)

FOREIGN PATENT DOCUMENTS

JP       2015-018432 A      1/2015

*Primary Examiner* — Lixi C Simpson
(74) *Attorney, Agent, or Firm* — Buchanan Ingersoll & Rooney PC

(57) ABSTRACT

A touch panel sharing support apparatus applicable for sharing a touch panel by a first system and a second system independent of each other, includes: a storage that stores definition data defining a first region for the first system and a second region for the second system, on a touch surface of the touch panel; a hardware processor that discriminates which of the first region and the second region a touched position on the touch surface belongs to on the basis of the definition data; and a transmitter that transmits operation data concerning operation onto the touch surface to the first system in a case where the hardware processor discriminates that the position belongs to the first region and transmits the operation data to the second system in a case where the hardware processor discriminates that the position belongs to the second region.

18 Claims, 15 Drawing Sheets

(51) Int. Cl.
  *H04N 1/00*   (2006.01)
  *G06F 9/451*  (2018.01)

(56) References Cited

U.S. PATENT DOCUMENTS

| | | | |
|---|---|---|---|
| 2015/0186024 A1* | 7/2015 | Hong | G06F 9/542 |
| | | | 715/800 |
| 2016/0188274 A1* | 6/2016 | Chen | G06F 3/1423 |
| | | | 345/2.1 |
| 2016/0202852 A1* | 7/2016 | Park | G06F 3/04817 |
| | | | 715/781 |
| 2016/0357388 A1* | 12/2016 | Paine | G06F 3/0418 |
| 2017/0371509 A1* | 12/2017 | Jung | G06F 3/04817 |

* cited by examiner

FIG. 11A

INPUT

| TIME | FINGER_1 | | FINGER_2 | |
|---|---|---|---|---|
| | COORDINATES | BOUNDARY CROSSING DETECTION | COORDINATES | BOUNDARY CROSSING DETECTION |
| T1 | (Xb1, Yb1) | NO | (Xc1, Yc1) | NO |
| T2 | (Xb2, Yb2) | NO | (Xc2, Yc2) | NO |
| T3 | (Xb3, Yb3) | YES | (Xc3, Yc3) | NO |
| T4 | (Xb4, Yb4) | NO | (Xc4, Yc4) | NO |
| T5 | (Xb5, Yb5) | NO | (Xc5, Yc5) | NO |
| ... | ... | | ... | |

FIG. 11B

OUTPUT

| TIME | FINGER_1 | FINGER_2 |
|---|---|---|
| | COORDINATES | COORDINATES |
| T1 | (Xb1, Yb1) | (Xc1, Yc1) |
| T2 | (Xb2, Yb2) | (Xc2, Yc2) |
| T3 | (Xb2, Yb2) | (Xc3, Yc3) |
| T4 | (Xb2, Yb2) | (Xc4, Yc4) |
| T5 | (Xb2, Yb2) | (Xc5, Yc5) |
| ... | ... | ... |

FIG. 12A

INPUT

| TIME | FINGER_1 COORDINATES | FINGER_1 BOUNDARY CROSSING DETECTION | FINGER_2 COORDINATES | FINGER_2 BOUNDARY CROSSING DETECTION |
|---|---|---|---|---|
| T1 | (Xb1, Yb1) | NO | (Xc1, Yc1) | NO |
| T2 | (Xb2, Yb2) | NO | (Xc2, Yc2) | NO |
| T3 | (Xb3, Yb3) | YES | (Xc3, Yc3) | NO |
| T4 | (Xb4, Yb4) | NO | (Xc4, Yc4) | NO |
| T5 | (Xb5, Yb5) | NO | (Xc5, Yc5) | NO |
| ... | ... | ... | ... | ... |

FIG. 12B

OUTPUT

| TIME | FINGER_1 COORDINATES | FINGER_2 COORDINATES |
|---|---|---|
| T1 | (Xb1, Yb1) | (Xc1, Yc1) |
| T2 | (Xb2, Yb2) | (Xc2, Yc2) |
| T3 | (Xb2, Yb2) | (Xc3, Yc3) |
| T4 | (Xb2, Yb2) | (Xc3+(Xc4−Xc3)*2, Yc3+(Yc4−Yc3)*2) |
| T5 | (Xb2, Yb2) | ((Xc3+(Xc4−Xc3)*2)+(Xc5−Xc4)*2, (Yc3+(Yc4−Yc3)*2)+(Yc5−Yc4)*2) |
| ... | ... | ... |

INPUT

| TIME | FINGER 1 COORDINATES | FINGER 1 BOUNDARY CROSSING DETECTION | FINGER 2 COORDINATES | FINGER 2 BOUNDARY CROSSING DETECTION |
|---|---|---|---|---|
| T1 | (Xb1, Yb1) | NO | (Xc1, Yc1) | NO |
| T2 | (Xb2, Yb2) | NO | (Xc1, Yc1) | NO |
| T3 | (Xb3, Yb3) | YES | (Xc1, Yc1) | NO |
| T4 | (Xb4, Yb4) | NO | (Xc1, Yc1) | NO |
| T5 | (Xb5, Yb5) | NO | (Xc1, Yc1) | NO |

OUTPUT

| TIME | COORDINATES | BOUNDARY CROSSING DETECTION | COORDINATES | BOUNDARY CROSSING DETECTION |
|---|---|---|---|---|
| T1 | (Xb1, Yb1) | NO | (Xc1, Yc1) | NO |
| T2 | (Xb2, Yb2) | NO | (Xc1, Yc1) | NO |
| T3 | (Xb2, Yb2) | YES | (Xc1 − (Xb3 − Xb2), Yc1 − (Yb3 − Yb2)) | NO |
| T4 | (Xb2, Yb2) | NO | (Xc1 − (Xb4 − Xb2), Yc1 − (Yb4 − Yb2)) | NO |
| T5 | (Xb2, Yb2) | NO | (Xc1 − (Xb5 − Xb2), Yc1 − (Yb5 − Yb2)) | NO |

6E — — — — —

TOUCH PANEL SHARING SUPPORT APPARATUS, TOUCH PANEL SHARING METHOD, AND COMPUTER PROGRAM

The entire disclosure of Japanese patent Application No. 2017-243508, filed on Dec. 20, 2017, is incorporated herein by reference in its entirety.

BACKGROUND

Technological Field

The present invention relates to a technique of sharing one touch panel by two systems independent of each other.

Description of the Related Art

Image forming apparatuses having various functions such as copy, scan, facsimile, and box are spreading. This type of image forming apparatus is sometimes referred to as a "multi function peripheral (MFP)".

Furthermore, there is a proposal, in recent years, for a technology of integrally configuring an image forming apparatus with a physical server (server machine or server unit). With this technology, it is possible to easily enhance expandability of the functions of the image forming apparatus than in the conventional cases. Hereinafter, an apparatus integrating an image forming apparatus with a server will be referred to as a "multifunctional machine".

A touch panel display of such a multifunctional machine simultaneously displays screens of the image forming apparatus and the server side by side and receives user's operation for each of the image forming apparatus and the server. JP 2015-18432 A discloses a technique for simultaneously displaying a plurality of screens for operation on a single display.

A gesture input device that changes display on a display by an input operation using a plurality of pointers includes an operation position detection unit that detects an operation position with respect to the display, a screen division processing unit that divides the display into a plurality of screens, and a finalization unit that finalizes a screen corresponding to an operation position farther from a boundary of divided screens among the screens corresponding to the operation positions of a plurality of fingers detected by the operation position detection unit, as an operation target screen.

As described above, user's operation for each of the image forming apparatus and the server is received by a single touch panel display. Meanwhile, each of the image forming apparatus and the server operates independently. Therefore, the image forming apparatus or the server sometimes performs processing unintended by the user depending on how to touch the touch panel display.

SUMMARY

In view of such problems, the present invention aims to make it possible for a user to perform operation for two systems independent of each other, such as an image forming apparatus and a server, by using a single touch panel display in more desired manner.

To achieve the abovementioned object, according to an aspect of the present invention, there is provided a touch panel sharing support apparatus applicable for sharing a touch panel by a first system and a second system independent of each other, and the touch panel sharing support apparatus reflecting one aspect of the present invention comprises: a storage that stores definition data defining a first region for the first system and a second region for the second system, on a touch surface of the touch panel; a hardware processor that discriminates which of the first region and the second region a touched position on the touch surface belongs to on the basis of the definition data; and a transmitter that transmits operation data concerning operation onto the touch surface to the first system in a case where the hardware processor discriminates that the position belongs to the first region and transmits the operation data to the second system in a case where the hardware processor discriminates that the position belongs to the second region.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIGS. 11A and 11B are diagrams respectively illustrating examples of each of coordinate data at the time of input and output in a second mode;

FIGS. 12A and 12B are diagrams respectively illustrating examples of coordinate data at the time of input and output in a third mode;

FIGS. 17A and 17B are diagrams respectively illustrating modifications of coordinate data at the time of input and output;

DETAILED DESCRIPTION OF EMBODIMENTS

Hereinafter, one or more embodiments of the present invention will be described with reference to the drawings. However, the scope of the invention is not limited to the disclosed embodiments.

Figure 1:
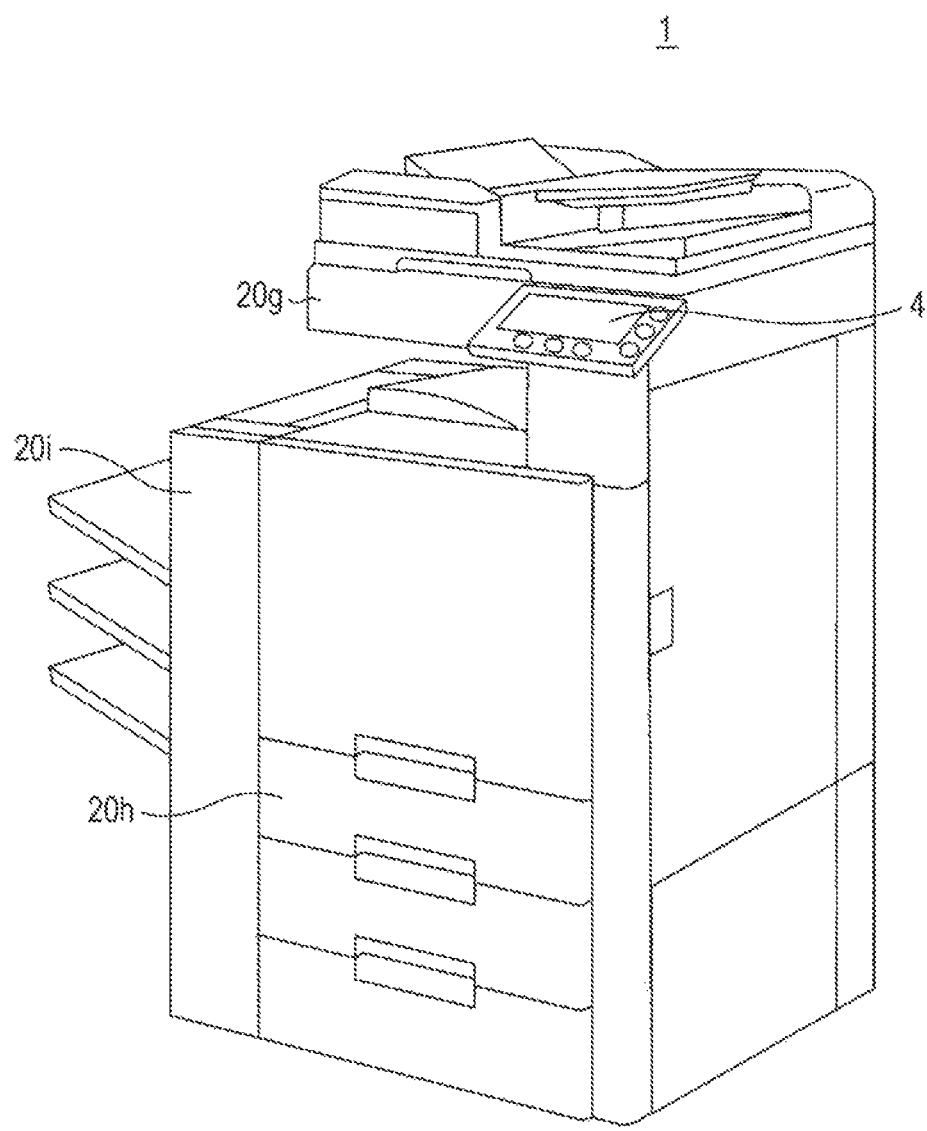
FIG. 1 is a diagram illustrating an example of an appearance of a multifunctional machine.
Figure 2:
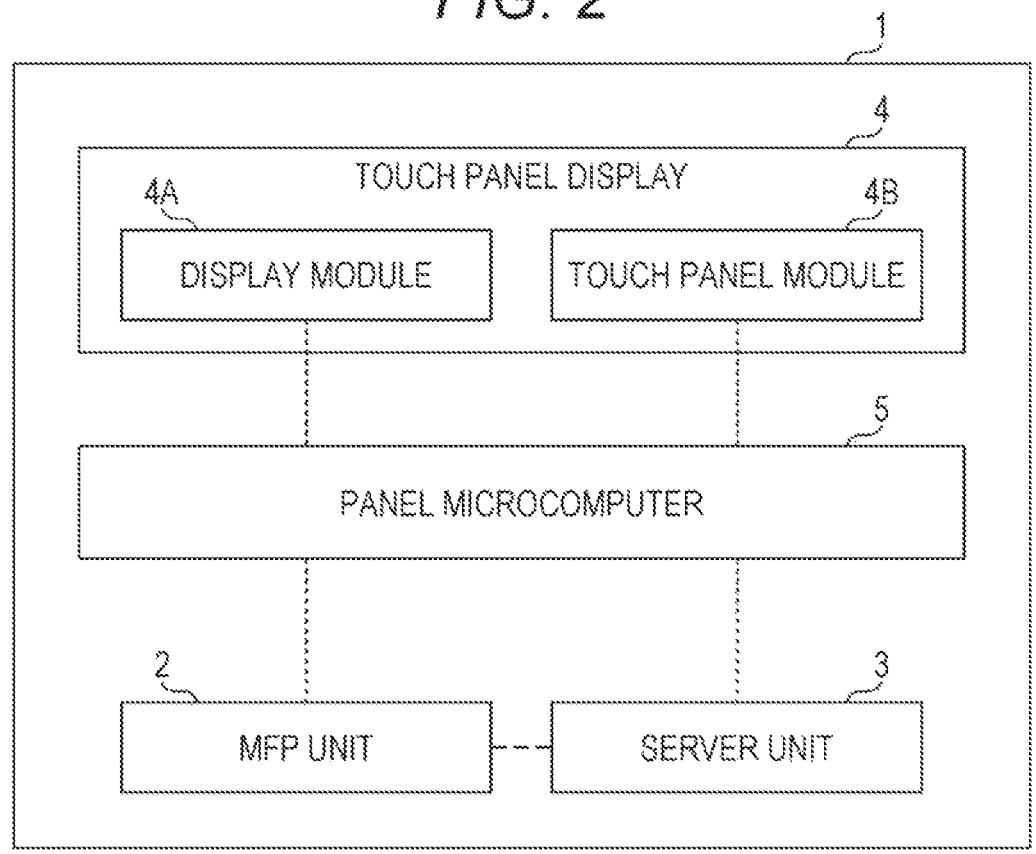
FIG. 2 is a diagram illustrating an exemplary hardware configuration of a multifunctional machine.
Figure 3:
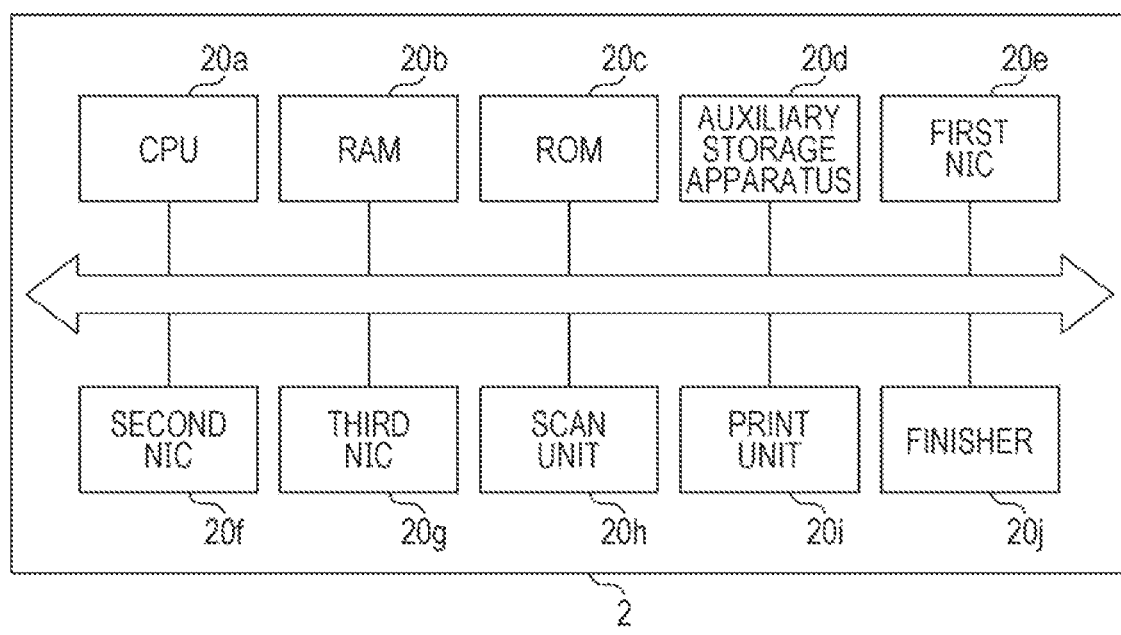
FIG. 3 is a diagram illustrating an example of a hardware configuration of an MFP unit.
Figure 4:
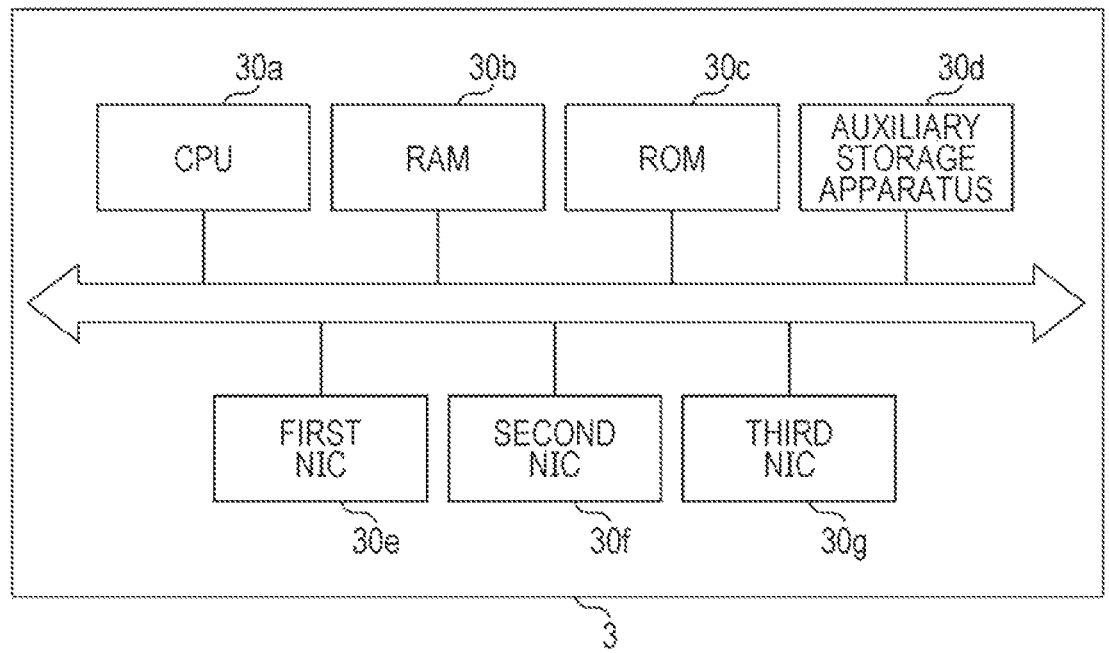
FIG. 4 is a diagram illustrating an example of a hardware configuration of a server unit.
Figure 5:
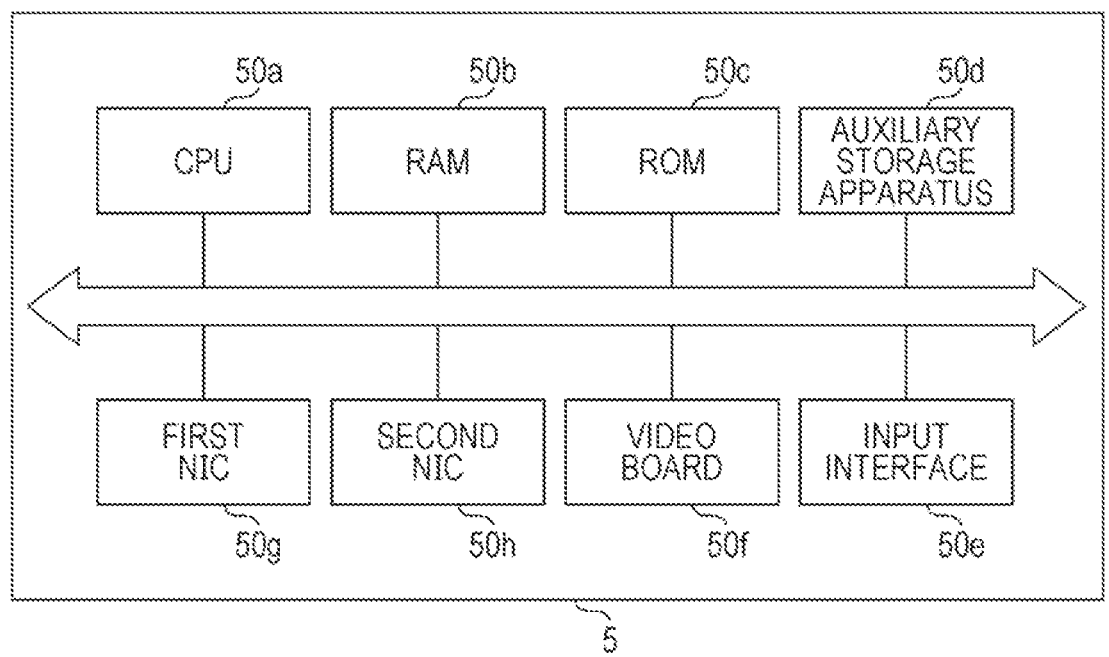
FIG. 5 is a diagram illustrating an example of a hardware configuration of a panel microcomputer.
Figure 6:
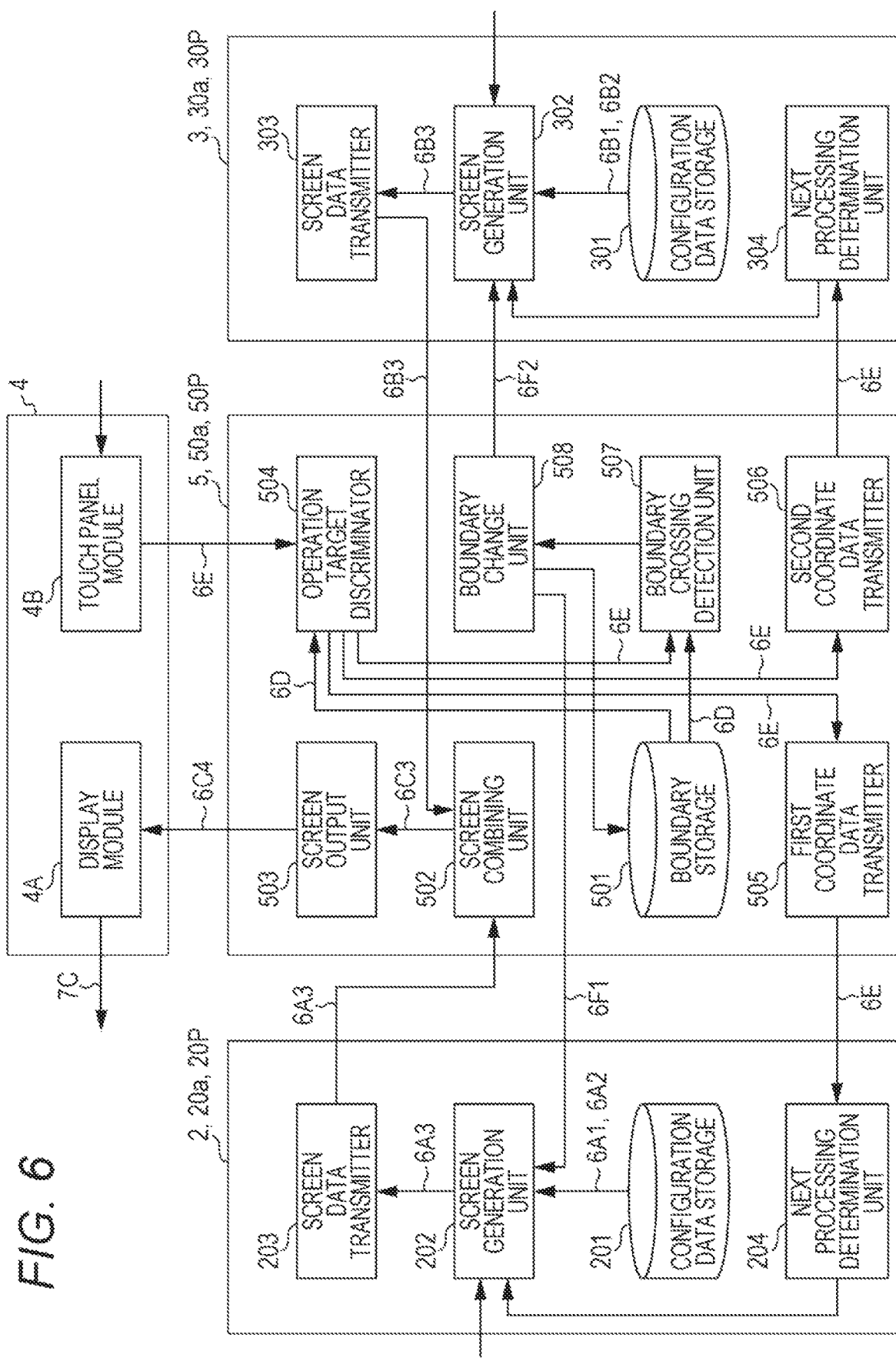
FIG. 6 is a diagram illustrating an example of a functional configuration of each of an MFP unit, a server unit, and a panel microcomputer.

FIG. 1 is a diagram illustrating an example of an appearance of a multifunctional machine 1. FIG. 2 is a diagram illustrating an exemplary hardware configuration of the multifunctional machine 1. FIG. 3 is a diagram illustrating an example of a hardware configuration of an MFP unit 2. FIG. 4 is a diagram illustrating an example of a hardware configuration of a server unit 3. FIG. 5 is a diagram illustrating an example of a hardware configuration of a panel microcomputer 5. FIG. 6 is a diagram illustrating an example of functional configuration of each of the MFP unit 2, the server unit 3, and the panel microcomputer 5.

The multifunctional machine 1 illustrated in FIG. 1 is an apparatus that integrates various functions. As illustrated in FIG. 1 or 2, the multifunctional machine 1 includes the MFP unit 2, the server unit 3, a touch panel display 4, and the panel microcomputer 5.

The server unit 3 is housed in a casing of the MFP unit 2. The touch panel display 4 is arranged in front of a scan unit 20h so that the display surface and the touch surface are slightly horizontal.

The MFP unit 2 is an apparatus corresponding to an image forming apparatus generally called a "multi function peripheral (MFP)" and has functions such as copy, PC print, facsimile, scan, and box.

The PC print function is a function of printing an image on a sheet on the basis of image data received from a device outside the multifunctional machine 1 or from the server unit 3.

A box function is a function of preparing a storage region called "box" or "personal box" for each of users to store and manage image data or the like in each of own storage regions. A box corresponds to a "folder" or a "directory" on a personal computer.

The server unit 3 is a device corresponding to a server machine or a personal computer, and has a function such as a web server or a file transfer protocol (FTP) server. An embedded computer (for example, embedded Linux (registered trademark) or Windows Embedded (registered trademark)) is used as the server unit 3. Embedded computers are also sometimes referred to as "embedded computer systems" or "built-in servers".

The touch panel display 4 is shared by the MFP unit 2 and the server unit 3. Specifically, a screen for the MFP unit 2 and a screen for the server unit 3 are displayed side by side on a display surface 4AS (refer to FIG. 9) for the user directly operating the multifunctional machine 1. Moreover, data indicating coordinates of a touched position on a touch surface 4BS is transmitted to the panel microcomputer 5.

The panel microcomputer 5 is a microcomputer that allows the MFP unit 2 and the server unit 3 to operate in cooperation with the touch panel display 4. The panel microcomputer 5 converts screen data for screen display received from the MFP unit 2 or the server unit 3 into a video signal and transmits the signal to the touch panel display 4. The panel microcomputer 5 further transmits coordinate data received from the touch panel display 4 to the MFP unit 2 or the server unit 3.

Basic services are provided to the user by each of the functions of MFP unit 2 and server unit 3. By further combining these functions, application services are provided to the user.

As illustrated in FIG. 1 or 3, the MFP unit 2 includes a central processing unit (CPU) 20a, a random access memory (RAM) 20b, a read only memory (ROM) 20c, an auxiliary storage apparatus 20d, a first network interface card (NIC) 20e, a second network interface card (NIC) 20f, a third network interface card (NIC) 20g, a scan unit 20h, a print unit 20i, and a finisher 20j.

The first NIC 20e communicates with an external device using a protocol such as transmission control protocol/internet protocol (TCP/IP).

The second NIC 20f is connected to a second NIC 30f (refer to FIG. 4) of the server unit 3 by a twisted pair cable, and communicates with the server unit 3 by using a protocol such as TCP/IP.

The third NIC 20g is connected to a first NIC 50e (refer to FIG. 5) of the panel microcomputer 5 by a twisted pair cable, and communicates with the panel microcomputer 5 by using a protocol such as TCP/IP.

Note that it is allowable to provide one NIC instead of three, in the MFP unit 2. In this case, a hub is provided in the multifunctional machine 1, and the hub is connected to a router, the NIC of the server unit 3, and the NIC of the panel microcomputer 5 by twisted pair cables. It is possible to communicate with an external device, the server unit 3, and the panel microcomputer 5 via the hub. Similarly in cases of the server unit 3 and the panel microcomputer 5 to be described below, it is also allowable to provide one NIC, rather than a plurality of NICs, and connect the router and each NIC to the hub.

The scan unit 20h reads an image on a sheet set on a platen glass base and generates image data.

The print unit 20i prints not merely an image read by the scan unit 20h but also an image represented by the image data received by the first NIC 20e from an external device of the multifunctional machine 1 or received from the server unit 3 by the second NIC 20f, on a sheet.

The finisher 20j applies post processing on a printed matter obtained by the print unit 20i as necessary. The post processing includes binding processing with a staple, punching processing, and folding processing.

An interface for the second NIC 20f and the third NIC 20g to be used is an interface defined by Institute of Electrical and Electronics Engineers (IEEE) 802.3 or the like. The same applies to the second NIC 30f, the third NIC 30g, the first NIC 50e, and the second NIC 50f described below.

The ROM 20c or the auxiliary storage apparatus 20d stores a program for implementation of individual functions such as the copy described above. A hard disk, a solid state drive (SSD), or the like, is used as the auxiliary storage apparatus 20d.

The ROM 20c or the auxiliary storage apparatus 20d further stores a screen output program 20P (refer to FIG. 6). The screen output program 20P is a program for transmitting screen data of the screen of the MFP unit 2 to the panel microcomputer 5.

These programs are loaded onto the RAM 20b and executed by the CPU 20a, as necessary.

As illustrated in FIG. 4, the server unit 3 includes a CPU 30a, a RAM 30b, a ROM 30c, an auxiliary storage apparatus 30d, a first NIC 30e, a second NIC 30f, and a third NIC 30g.

The first NIC 30e communicates with a device outside the multifunctional machine 1 using a protocol such as TCP/IP.

The second NIC 30f is connected to a second NIC 20f (refer to FIG. 3) of the MFP unit 2 by a twisted pair cable, and communicates with the MFP unit 2 by using a protocol such as TCP/IP.

The third NIC 30g is connected to a second NIC 50h (refer to FIG. 5) of the panel microcomputer 5 by a twisted pair cable, and communicates with the panel microcomputer 5 by using a protocol such as TCP/IP.

The ROM 30c or the auxiliary storage apparatus 30d stores not merely an operating system but also a program for implementation of the above-described functions. A hard disk drive, an SSD, or the like, is used as the auxiliary storage apparatus 30d.

The ROM 30c or the auxiliary storage apparatus 30d further stores a screen output program 30P (refer to FIG. 6). The screen output program 30P is a program for transmitting screen data of the screen of the server unit 3 to the panel microcomputer 5.

These programs are loaded onto the RAM 30b and executed by the CPU 30a, as necessary.

As illustrated in FIG. 2, the touch panel display 4 includes a display module 4A, and a touch panel module 4B.

The display module 4A displays a screen on the basis of the video signal transmitted from the panel microcomputer 5. A flat panel display such as an organic Electro Luminescence (EL) display or a liquid crystal display is used as the display module 4A.

Every time the touch panel module 4B detects that the touch surface 4BS (refer to FIG. 9) is touched, the touch panel module 4B transmits coordinate data 6E described below to the panel microcomputer 5.

As illustrated in FIG. 5, the panel microcomputer 5 includes a CPU 50a, a RAM 50b, a ROM 50c, an auxiliary storage apparatus 50d, a first NIC 50e, a second NIC 50f, a video board 50g, and an input interface 50h.

The first NIC 50e is connected to the third NIC 20g (refer to FIG. 3) of the MFP unit 2 by a twisted pair cable, and communicates with the MFP unit 2 by using a protocol such as TCP/IP.

The second NIC 50f is connected to the third NIC 20g (refer to FIG. 4) of the server unit 3 by a twisted pair cable, and communicates with the server unit 3 by using a protocol such as TCP/IP.

The video board 50g converts the screen data into a video signal and transmits the signal to the display module 4A. The video board 50g is sometimes referred to as a "graphic board", a "liquid crystal display (LCD) controller" or a "video card".

An interface of the video board 50g uses High-Definition Multimedia Interface (HDMI) (registered trademark) or D-Subminiature (D-SUB), or the like.

The input interface 50h is connected to the touch panel module 4B by using a cable, and a signal is input from the touch panel module 4B.

An interface of the input interface 50h uses IEEE 1394, Universal Serial Bus (USB), or the like.

The ROM 50c or the auxiliary storage apparatus 50d stores an operating system or the like. A hard disk drive, an SSD, or the like, is used as the auxiliary storage apparatus 50d.

The ROM 50c or the auxiliary storage apparatus 50d further stores a relay program 50P (refer to FIG. 6). The relay program 50P is a program that combines a screen of the MFP unit 2 and a screen of the server unit 3 with each other, transmits the combined image to the display module 4A as a video signal, and transmits a signal input from the touch panel module 4B to any of the MFP unit 2 and the server unit 3.

These programs are loaded onto the RAM 50b and executed by the CPU 50a, as necessary.

With the execution of the screen output program 20P, it is possible implement units such as a configuration data storage 201, a screen generation unit 202, a screen data transmitter 203, and a next processing determination unit 204 illustrated in FIG. 6, onto the MFP unit 2.

With the execution of the screen output program 30P, it is possible implement units such as a configuration data storage 301, a screen generation unit 302, a screen data transmitter 303, and a next processing determination unit 304, onto the server unit 3.

With the execution of the relay program 50P, it is possible implement units such as a boundary storage 501, a screen combining unit 502, a screen output unit 503, an operation target discriminator 504, a first coordinate data transmitter 505, a second coordinate data transmitter 506, a boundary crossing detection unit 507, and a boundary change unit 508, onto the panel microcomputer 5.

Hereinafter, processing of each of portions of the MFP unit 2, each of portions of the server unit 3, and each of portions of the panel microcomputer 5 will be described with the processing roughly divided into processing for displaying the screen and processing for responding to the touch.

[Processing for Displaying Screen]

Figure 7:
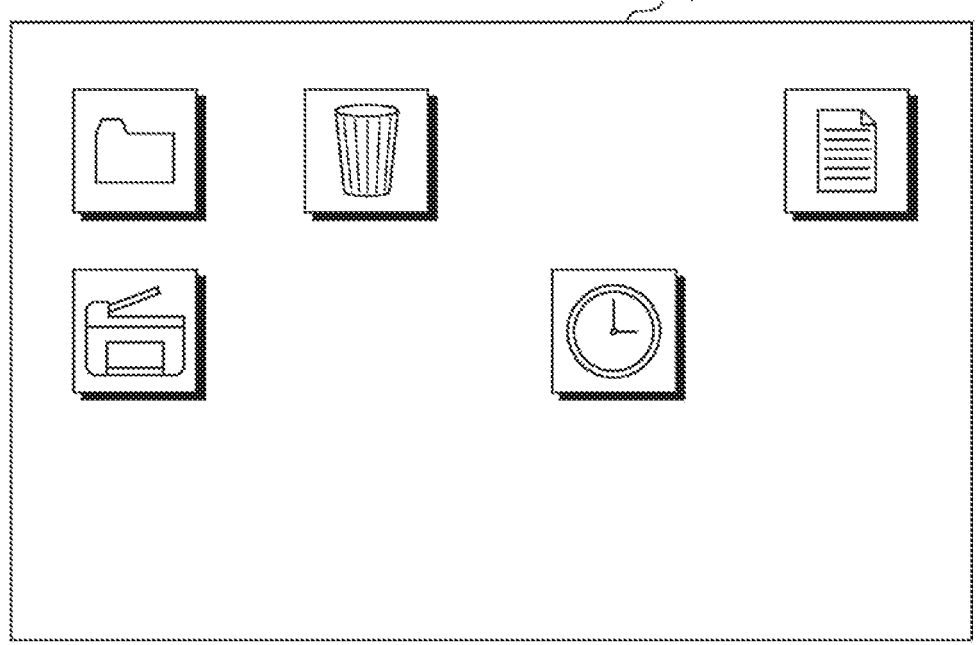
FIG. 7 is a diagram illustrating an example of a desktop screen.
Figure 8:
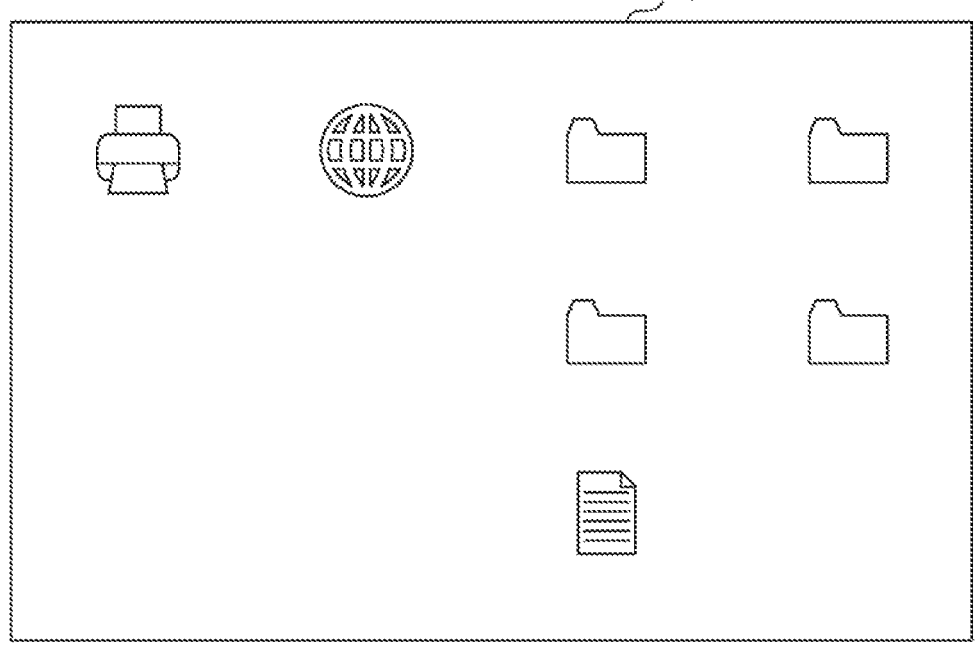
FIG. 8 is a diagram illustrating an example of a desktop screen.
Figure 9:
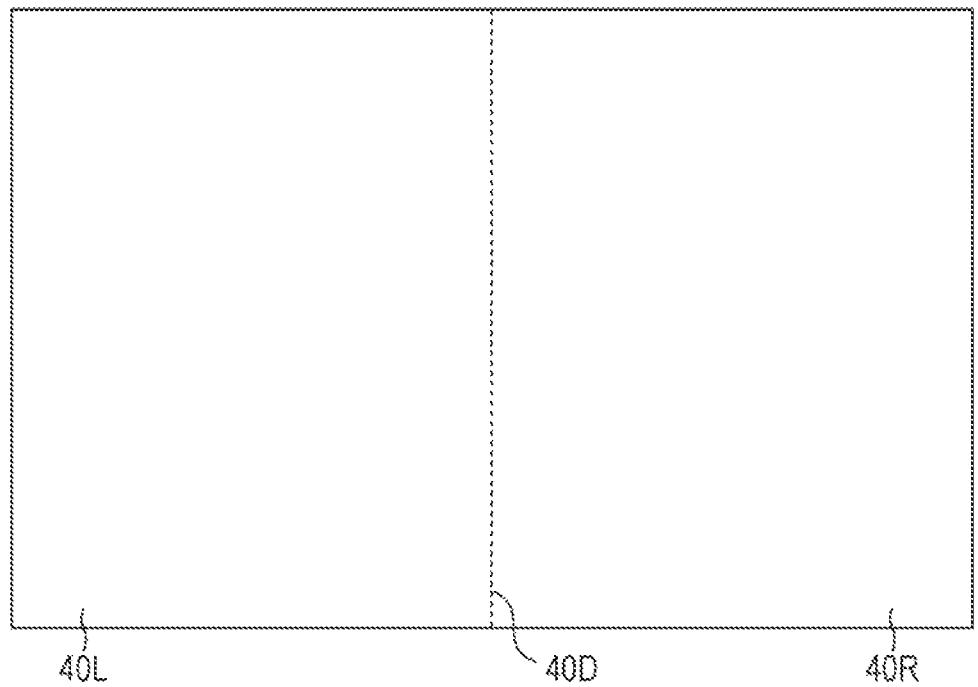
FIG. 9 is a diagram illustrating an example of dividing a display surface and a touch surface at a boundary.
Figure 10:
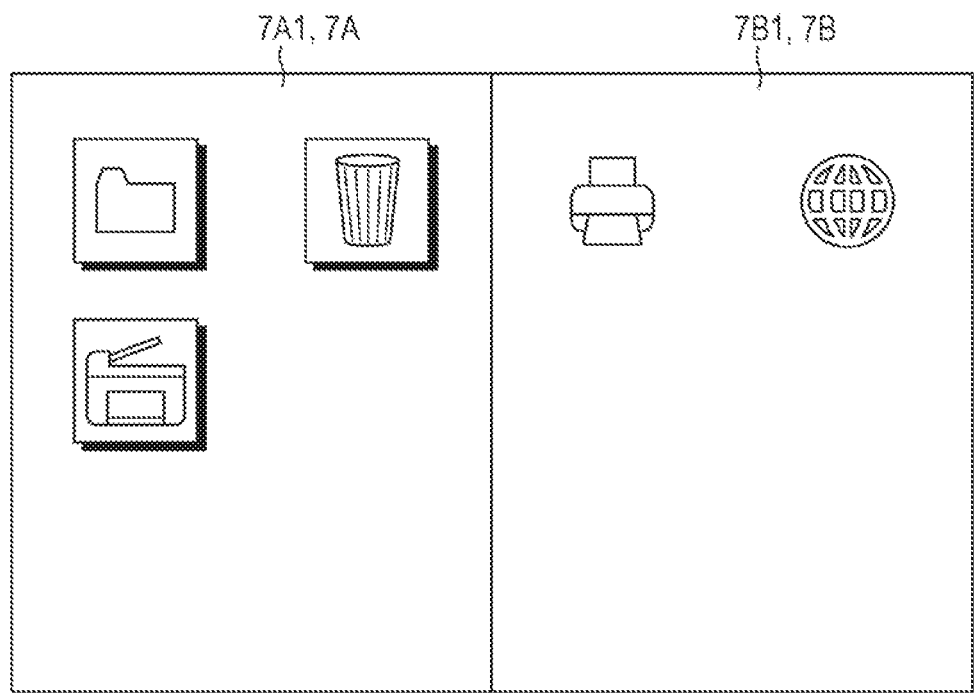
FIG. 10 is a diagram illustrating an example of a combined screen.

FIG. 7 is a diagram illustrating an example of a desktop screen 7A1. FIG. 8 is a diagram illustrating an example of a desktop screen 7B1. FIG. 9 is a diagram illustrating an example of dividing the display surface 4AS and the touch surface 4BS at a boundary 40D. FIG. 10 is a diagram illustrating an example of a combined screen 7C.

In the MFP unit 2, the configuration data storage 201 preliminarily stores screen configuration data 6A1 indicating the arrangement or the like of each of objects constituting an MFP screen 7A being a screen used by the user to operate the MFP unit 2, for each of the MFP screens 7A. In addition, image data 6A2 for each of objects is preliminarily stored.

In the present embodiment, the size (vertical and horizontal length) of each of the MFP screens 7A is preliminarily determined to be uniform, being same as the size of the display surface 4AS of the display module 4A. The similar applies to a server screen 7B to be described below. For the sake of simplicity of explanation, a case where the resolution of the display surface 4AS and the resolution of the touch surface 4BS of the touch panel module 4B are the same will be described as an example. In addition, on any of the display surface 4AS, the touch surface 4BS, and the screens described below, a top point at the upper left corner is defined as an origin, the vertical axis is defined as the Y axis, and the horizontal axis is as the X axis.

The screen generation unit 202 generates screen data 6A3 for displaying all or a part of the MFP screen 7A on the display module 4A on the basis of the screen configuration data 6A1 of the MFP screen 7A and on the basis of the image data 6A2 of each of objects constituting the MFP screen 7A.

Hereinafter, a portion to be displayed on the display module 4A on a certain screen will be described as a "display target portion".

At the startup of the screen output program 20P, a left half of the desktop screen 7A1 as illustrated in FIG. 7, which is one of the MFP screens 7A, is the display target portion. Accordingly, after the start of the screen output program 20P, the screen data 6A3 of the display target portion is first generated by the screen generation unit 202.

The format of the screen data 6A3 is, for example, a bitmap. The format may be Graphics Interchange Format (GIF), Joint Photographic Experts Group (JPEG), or the like. Alternatively, the screen generation unit 202 may draw a display target portion of the MFP screen 7A at a predetermined frame rate to generate moving image data as the screen data 6A3. The similar applies to screen data 6B3 to be described below.

Note that these screen configuration data 6A1 and image data 6A2 are read from the configuration data storage 201. Pixels of preset color may be arranged at a portion of the MFP screen 7A where no object is arranged, namely, a margin.

The screen data transmitter 203 transmits the screen data 6A3 generated by a screen generation unit 202 to the panel microcomputer 5. In a case where the screen data 6A3 is moving image data, it is transmitted by live streaming.

In the server unit 3, the configuration data storage 301 preliminarily stores screen configuration data 6B1 illustrating the arrangement or the like of each of objects constituting an MFP screen 7B being a screen used by the user to operate the server unit 3, for each of the server screens 7B. In addition, image data 6B2 for each of objects is preliminarily stored.

The screen generation unit 302 generates screen data 6B3 for displaying a display target portion of the server screen 7B on the display module 4A on the basis of the screen configuration data 6B1 of the server screen 7B and on the basis of the image data 6B2 of each of objects constituting the server screen 7B.

At the startup of the screen output program 30P, a left half of the desktop screen 7B1 as illustrated in FIG. 8, which is one of the server screens 7B, is the display target portion, and screen data 6B3 for this display target portion is generated.

Note that the screen configuration data 6B1 and the image data 6B2 are read from the configuration data storage 301. Pixels of preset color may be arranged at a portion of the server screen 7B where no object is arranged, namely, a margin.

The screen data transmitter 303 transmits the screen data 6B3 generated by the screen generation unit 302 to the panel microcomputer 5. In a case where the screen data 6B3 is moving image data, it is transmitted by live streaming.

Meanwhile, as illustrated in FIG. 9, the display surface 4AS of the display module 4A and the touch surface 4BS of the touch panel module 4B are each divided into two left and right regions on the boundary 40D. A left region 40L, which is a region on the left side, is used in principle for display or operation of the MFP screen 7A. A right region 40R, which is a region on the right side, is used in principle for display or operation of the server screen 7B.

In the panel microcomputer 5, the boundary storage 501 stores boundary coordinate data 6D. The boundary coordinate data 6D indicates coordinates of the boundary 40D on the display surface 4AS and the touch surface 4BS. At the startup of the relay program 50P, a line segment dividing the display surface 4AS and the touch surface 4BS into right and left halves is set as the boundary 40D. That is, the coordinates of this line segment are indicated as the coordinates of the boundary 40D in the boundary coordinate data 6D.

The screen combining unit 502 generates screen data 6C3 of the combined screen 7C on the basis of the screen data 6A3 received from the MFP unit 2 and the screen data 6B3 received from the server unit 3. The combined screen 7C is a screen in which the MFP screen 7A and the server screen 7B are arranged side by side as illustrated in FIG. 10.

After generation of the screen data 6C3 by the screen combining unit 502, the screen output unit 503 causes the video board 50g to execute processing of converting the screen data 6C3 into a video signal 6C4 and outputting this signal to the display module 4A.

Subsequently, the display module 4A displays the combined screen 7C on the basis of the video signal 6C4.

[Processing for Responding to Touch]

Figure 13A:
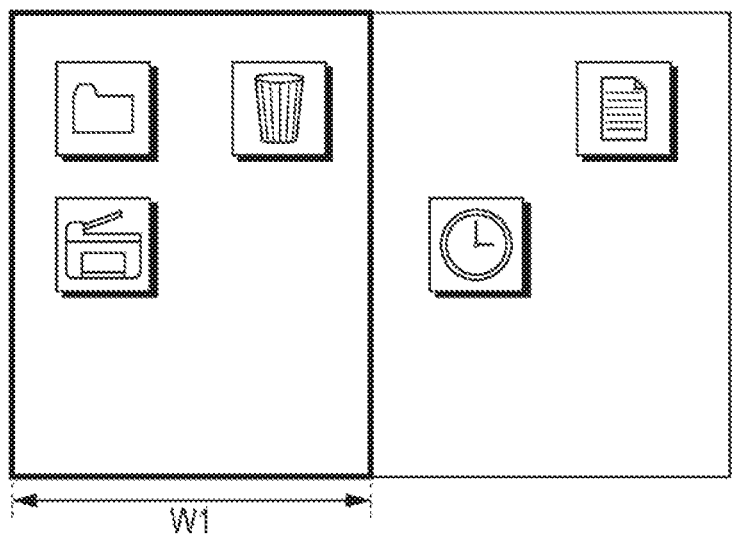
FIGS. 13A to 13C are diagrams illustrating examples of display target portions of a desktop screen.
Figure 13B:
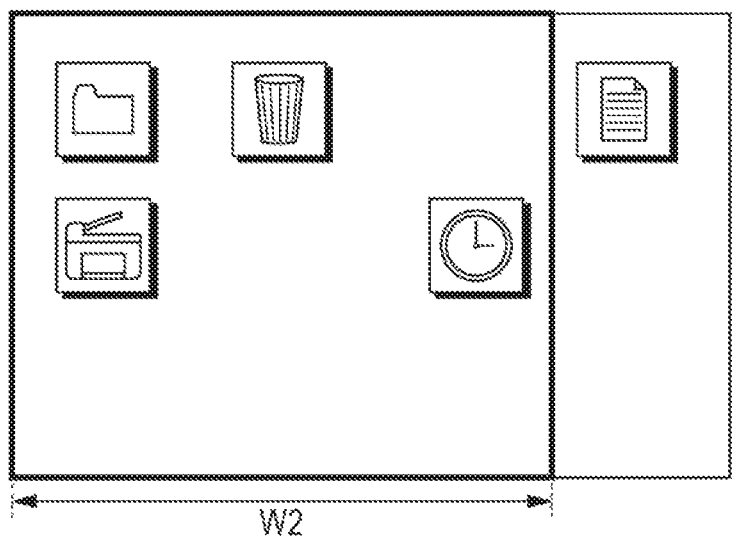
Figure 13C:
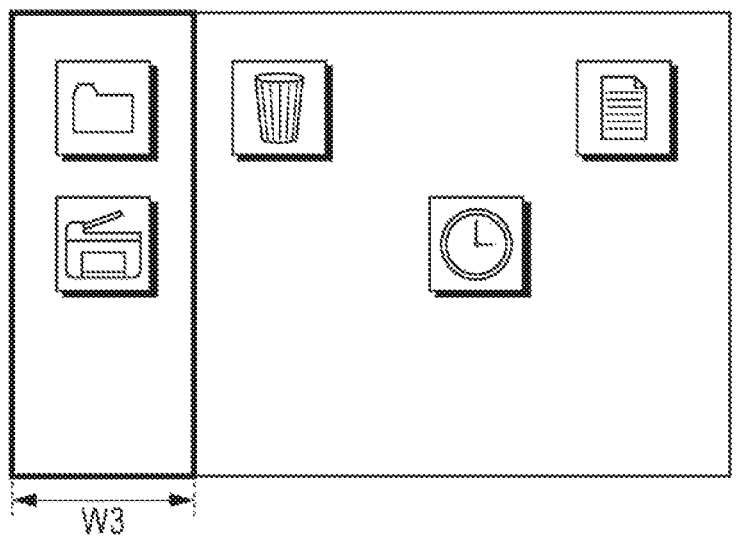

FIGS. 11A and 11B are diagrams respectively illustrating examples of coordinate data 6E at the time of input and output in a second mode. FIGS. 12A and 12B are diagrams illustrating examples of coordinate data 6E at each of the times of input and output in a third mode. FIGS. 13A to 13C are diagrams illustrating examples of display target portions of the desktop screen 7A1.

A single user can touch the touch surface 4BS and then perform a gesture such as tapping, flicking, or dragging so as to operate either the MFP unit 2 or the server unit 3. It is possible to perform simultaneous operation of both. Alternatively, the boundary 40D can be moved to the right or to the left.

The touch panel module 4B transmits the coordinate data 6E indicating the coordinates of the touched position to the panel microcomputer 5 periodically, for example, every 0.1 seconds while the touch surface 4BS is being touched.

Furthermore, the user can perform a gesture such as pinch-in or pinch-out by simultaneously touching the touch surface 4BS with two fingers. In this case, the touch panel module 4B transmits data indicating the coordinates of each of the plurality of touched positions to the panel microcomputer 5 as coordinate data 6E. In the present embodiment, however, in a case where the user uses two fingers, it is assumed that the user first touches either one of the right region 40R or the left region 40L with both of the fingers. After the touch is started, the finger may cross the boundary 40D.

After the coordinate data 6E starts to be received by the panel microcomputer 5, the operation target discriminator 504 discriminates whether the user's operation is operation for the MFP unit 2, operation for the server unit 3, or operation of changing the boundary 40D as follows.

In a case where one set of coordinates is indicated in the coordinate data 6E received first from the start of touch, the operation target discriminator 504 discriminates whether the boundary 40D is touched on the basis of the indicated coordinates and the coordinates of the boundary 40D. In a case where it is discriminated that the touch has been made, discrimination is made to the effect that the user's operation is operation of changing the boundary 40D. Note that the coordinates of the boundary 40D are indicated in the boundary coordinate data 6D stored in the boundary storage 501.

Otherwise, when the coordinate indicated in the coordinate data 6E is any of the coordinates in the left region 40L, the operation target discriminator 504 discriminates that the user's operation is operation for the MFP unit 2. When the coordinates indicated in the coordinate data 6E are any of the coordinates in the right region 40R, the operation target discriminator 504 discriminates that the user's operation is operation for the server unit 3.

When the operation target discriminator 504 discriminates that the user's operation is operation for the MFP unit 2, the first coordinate data transmitter 505 sequentially transmits the first received coordinate data 6E and subsequently and continuously received coordinate data 6E to the MFP unit 2.

However, when the boundary crossing is detected by the boundary crossing detection unit 507, the first coordinate data transmitter 505 corrects the coordinate data 6E or even stops transmission of the coordinate data 6E. This similarly applies to the second coordinate data transmitter 506.

In addition, the first coordinate data transmitter 505 may discriminate what type of gesture was performed by user's operation on the basis of the coordinate data 6E. The data indicating the discriminated gesture may be transmitted to the MFP unit 2. This similarly applies to the second coordinate data transmitter 506. Alternatively, the gesture may be discriminated by the MFP unit 2 or the server unit 3.

When the operation target discriminator 504 discriminates that the user's operation is operation for the server unit 3, the second coordinate data transmitter 506 sequentially transmits the first received coordinate data 6E and subsequently and continuously received coordinate data 6E to the server unit 3. However, since the origin of the touch surface 4BS does not match the origin of the server screen 7B, the coordinate data 6E is corrected on the basis of the coordinates of the boundary 40D and transmitted. For example, when the X coordinate of the boundary 40D is "Xd" and the coordinates indicated in the received coordinate data 6E are (Xa1, Ya1) and (Xa2, Ya2), then the coordinate data 6E is corrected to indicate (Xa1-Xd, Ya1) and (Xa2-Xd, Ya2), and then transmitted. Hereinafter, the processing of correcting the X coordinate indicated in the coordinate data 6E corresponding to the X coordinate of the boundary 40D will be described as "correction processing".

Note that when the reception of the coordinate data 6E is interrupted, the first coordinate data transmitter 505 and the second coordinate data transmitter 506 discriminate that the finger has been released from the touch surface 4BS. When the coordinate data 6E starts to be received again, the above processing is resumed.

In a case where the operation target discriminator 504 discriminates that the user's operation is operation for the MFP unit 2 or an operation for the server unit 3, the boundary crossing detection unit 507 monitors the coordinates of the coordinate data 6E received from the second time onward and thereby detects that the touched position has moved from one of the right region 40R and the left region 40L to the other. In other words, the boundary crossing detection unit 507 detects that the touched position has crossed the boundary 40D (hereinafter referred to as "boundary crossing").

When the boundary crossing is detected by the boundary crossing detection unit 507, the first coordinate data transmitter 505 or the second coordinate data transmitter 506 transmits the coordinate data 6E as follows depending on the mode set in the panel microcomputer 5.

When the user's operation is operation on the MFP unit 2 in a case where the first mode is set, the first coordinate data transmitter 505 judges that the finger has been released from the touch surface 4BS. Subsequently, the first coordinate data transmitter 505 stops transmission of the coordinate data 6E at a point of detection of the boundary crossing. Alternatively, the coordinate data 6E may be corrected so as to indicate the coordinates at a point when the finger just reached the boundary 40D and may be transmitted to the MFP unit 2. Thereafter, the transmission to the MFP unit 2 is not performed even when the coordinate data 6E is continuously received as before. Transmission to server unit 3 is not to be performed either.

Similarly, when the user's operation is operation on the server unit 3, the second coordinate data transmitter 506 judges that the finger has been released from the touch surface 4BS. Subsequently, the first coordinate data transmitter 505 stops transmission of the coordinate data 6E at a point of detection of the boundary crossing. Alternatively, the coordinate data 6E may be corrected so as to indicate the coordinates at a point when the finger just reached the boundary 40D and may be transmitted to the server unit 3. Thereafter, the transmission to the server unit 3 is not to be performed even when the coordinate data 6E is continuously received as before. Transmission to the MFP unit 2 is not to be performed either.

Alternatively, when the user's operation is operation for the MFP unit 2 in a case where the second mode is set, the first coordinate data transmitter 505 judges that the finger that has crossed the boundary 40D has been held on the boundary 40D.

Thereafter, in a case where one set of coordinates alone is indicated for each of the coordinate data 6E while the coordinate data 6E is continuously received as before, the first coordinate data transmitter 505 transmits the coordinate data 6E that has been received immediately before detection of the boundary crossing to the MFP unit 2, instead of these pieces of coordinate data 6E. Alternatively, the coordinate data 6E may be corrected so as to indicate the coordinates at a point when the finger just reached the boundary 40D and may be transmitted to the MFP unit 2.

In a case where a plurality of sets of coordinates is indicated for each of the coordinate data 6E, the first coordinate data transmitter 505 replaces the coordinates that crosses the boundary 40D among the plurality of sets of coordinates into the coordinates immediately before detection of the boundary crossing or the coordinates at a point of reaching the boundary 40D, and then transmits the coordinate data 6E after replacement to the MFP unit 2. Even after the boundary crossing is detected, the coordinate data 6E is not transmitted to the server unit 3.

For example, in a case where the coordinate data 6E as illustrated in FIG. 11A has been received before and after the boundary crossing, the first coordinate data transmitter 505 rewrites the coordinates as illustrated in FIG. 11B and transmits the coordinate data 6E to the MFP unit 2.

Similarly, when the user's operation is operation for the server unit 3, the second coordinate data transmitter 506 judges that the finger that has crossed the boundary 40D has been held on the boundary 40D.

Thereafter, in a case where one set of coordinates alone is indicated for each of the coordinate data 6E while the coordinate data 6E is continuously received as before, the second coordinate data transmitter 506 applies shift processing on the coordinate data 6E that has been received immediately before detection of the boundary crossing to the MFP unit 2 and transmits this data to the server unit 3 instead of these pieces of coordinate data 6E. Alternatively, the coordinate data 6E may be corrected so as to indicate the coordinates at a point when the finger just reached the boundary 40D, undergo shift processing, and then may be transmitted to the server unit 3.

In a case where a plurality of sets of coordinates is indicated for each of the coordinate data 6E, the second coordinate data transmitter 506 replaces the coordinates that has crossed the boundary 40D among the plurality of coordinates into the coordinates immediately before detection of the boundary crossing or the coordinates at a point of reaching the boundary 40D, applies shift processing on the coordinate data 6E after replacement, and transmits this data to the server unit 3. Even after the boundary crossing is detected, the coordinate data 6E is not transmitted to the MFP unit 2.

Alternatively, in a case where the third mode is set, the first coordinate data transmitter 505 judges that the finger that has crossed the boundary 40D is held on the boundary 40D, similar to the case of the second mode. In a case where one set of coordinates alone is indicated in the coordinate data 6E, the transmission processing is performed in a manner similar to the case of the second mode. This similarly applies to the second coordinate data transmitter 506.

In a case where a plurality of sets of coordinates is indicated in the coordinate data 6E, and after the boundary crossing has been detected, the first coordinate data transmitter 505 replaces the coordinates that has crossed the boundary 40D among these coordinates with the coordinates just before detection of the boundary crossing, similarly to the case of the second mode. In the third mode, however, the coordinates that have not crossed the boundary 40D are further changed so as to double the moving distance of the finger touching the position of the coordinate. That is, the coordinates that have not crossed the boundary 40D are changed so as to indicate that the finger is moving at twice the actual speed. Thereafter, the coordinate data 6E after replacement and change is transmitted to the MFP unit 2. Even after the boundary crossing is detected, the coordinate data 6E is not transmitted to the server unit 3.

For example, in a case where the coordinate data 6E as illustrated in FIG. 12A has been received before and after the boundary crossing, the first coordinate data transmitter 505 rewrites the coordinates as illustrated in FIG. 12B and transmits the coordinate data 6E to the MFP unit 2.

Similarly to the first coordinate data transmitter 505, the second coordinate data transmitter 506 replaces and changes the coordinate data 6E, and applies shift processing to the coordinate data 6E after replacement and change, and transmits the data to the server unit 3. Even after the boundary crossing is detected, the coordinate data 6E is not transmitted to the MFP unit 2.

In the MFP unit 2, the next processing determination unit 204 determines the next processing to be executed (hereinafter referred to as "next processing") on the basis of the coordinates indicated in the coordinate data 6E received from the panel microcomputer 5.

For example, in a case where the desktop screen 7A1 is currently displayed as the MFP screen 7A, and in a case where the coordinate data 6E has been received once or several times consecutively and these pieces of coordinate data 6E indicate the coordinates of a trash can icon in the desktop screen 7A1, the next processing determination unit 204 determines the next processing as the processing of opening the trash can screen.

Alternatively, in a case where the desktop screen 7A1 is currently displayed as the MFP screen 7A and the coordinate data 6E is received several times consecutively and two sets of coordinates are indicated in each of the coordinate data 6E and the distance between the two coordinates gradually increases (in a case where the gesture is pinch-out), the next processing determination unit 204 determines the next processing to processing of enlarging (zooming) the desktop screen 7A1.

The next processing determined by the next processing determination unit 204 is then executed in the MFP unit 2.

For example, in a case where the next processing is determined to open the trash can screen, the screen generation unit 202 generates screen data of the trash can screen as the screen data 6A3, and then, the screen data transmitter 203 transmits the screen data 6A3 to the server unit 3.

Alternatively, in a case where the next processing is determined to be processing of enlarging the desktop screen 7A1, the screen generation unit 202 generates data for enlarging and displaying the desktop screen 7A1 in accordance with a change in the distance between the two coordinates, as the screen data 6A3, and then, the screen data transmitter 203 transmits the generated screen data 6A3 to the server unit 3.

In the server unit 3, the next processing determination unit 304 determines next processing on the basis of the coordinates indicated in the coordinate data 6E received from the panel microcomputer 5. The determined next processing is then executed in the server unit 3.

In the panel microcomputer 5, in a case where the operation target discriminator 504 discriminates that the user's operation is operation of changing the boundary 40D, the boundary change unit 508 performs the processing of changing the boundary 40D as follows.

The boundary change unit 508 selects the last received coordinate data 6E among the coordinate data 6E consecutively received from the first time and onward. The boundary change unit 508 then updates the boundary coordinate data 6D so that the X coordinate of the coordinates indicated in the selected coordinate data 6E becomes the X coordinate of the boundary 40D. As a result, the boundary 40D is changed, and the left region 40L and the right region 40R are also changed.

Furthermore, the boundary change unit 508 transmits boundary change data 6F1 indicating a changed width of the left region 40L to the MFP unit 2, while transmitting boundary change data 6F2 indicating a changed width of the right region 40R to the MFP unit 2.

In the MFP unit 2, when the boundary change data 6F1 is received, the screen generation unit 202 expands or narrows the display target portion of the currently displayed MFP screen 7A in accordance with the width indicated by the boundary change data 6F1. It is allowable to expand or narrow any of the left or the right of the display target portion.

For example, as illustrated in FIG. 13A, in a case where the width of the display target portion is a width W1 and the width indicated by the boundary change data 6F1 is a width W2 and the width W1<the width W2 is satisfied, the screen generation unit 202 expands the display target portion as indicated by a thick frame in FIG. 13B. Alternatively, in a case where the width indicated by the boundary change data 6F1 is a width W3 and the width W1>width W3 is satisfied, the screen generation unit 202 narrows the display target portion as illustrated by a thick frame in FIG. 13C.

In this manner, the screen generation unit 202 generates the screen data 6A3 of the display target portion having its width expanded or narrowed. The screen data transmitter 203 transmits the screen data 6A3 to the panel microcomputer 5.

In the server unit 3, when the boundary change data 6F2 is received, the screen generation unit 302 expands or narrows the display target portion of the currently displayed server screen 7B in accordance with the width indicated by the boundary change data 6F2. The way of expanding and narrowing the display target portion of the server screen 7B is similar to the way of expanding and narrowing the display target portion of the MFP screen 7A.

The screen generation unit 302 then generates the screen data 6B3 of the display target portion having its width expanded or narrowed. The screen data transmitter 303 transmits the screen data 6B3 to the panel microcomputer 5.

Thereafter, in the panel microcomputer 5, a combined screen 7C corresponding to the changed boundary 40D is generated on the basis of the new screen data 6A3 and the screen data 6B3, and then displayed by the display module 4A.

Figure 14:
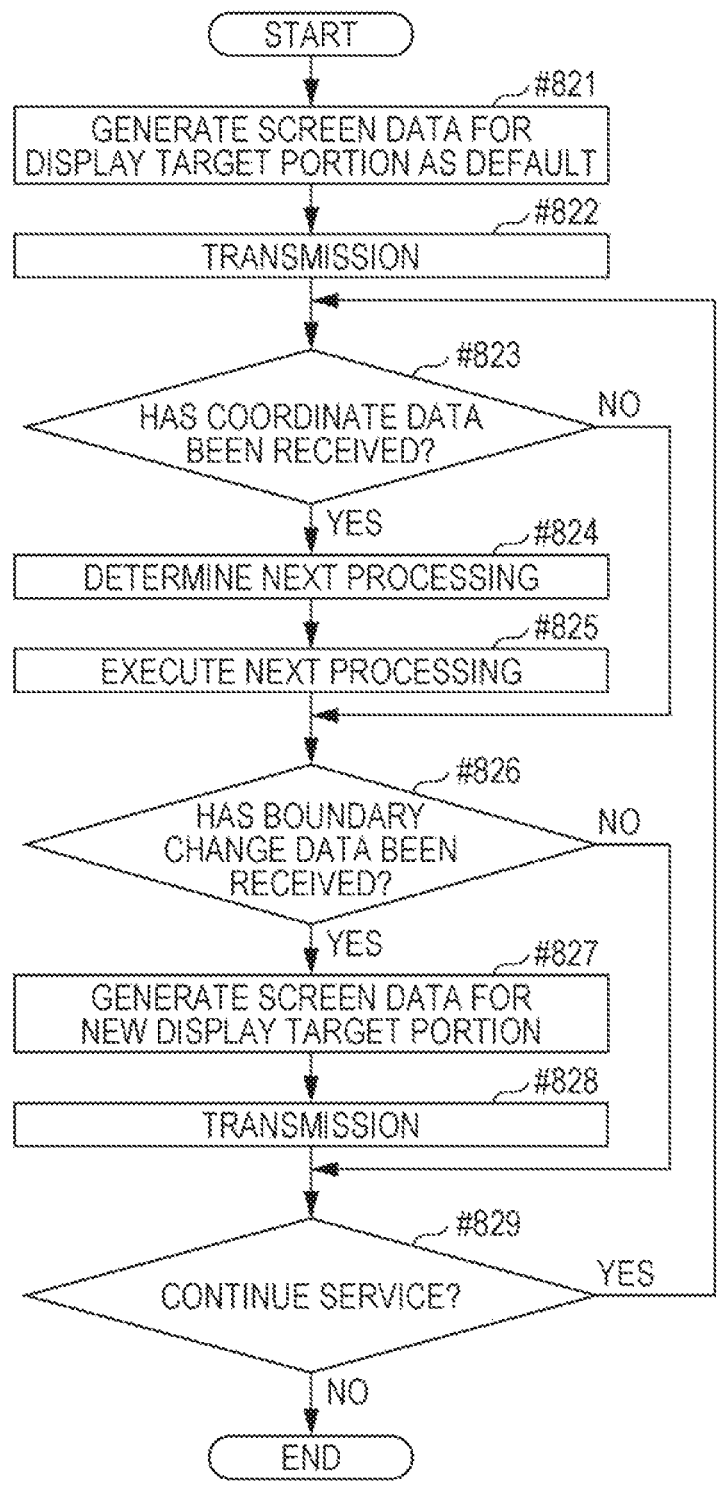
FIG. 14 is a flowchart illustrating an example of an overall processing flow of an MFP unit or a server unit.
Figure 15:
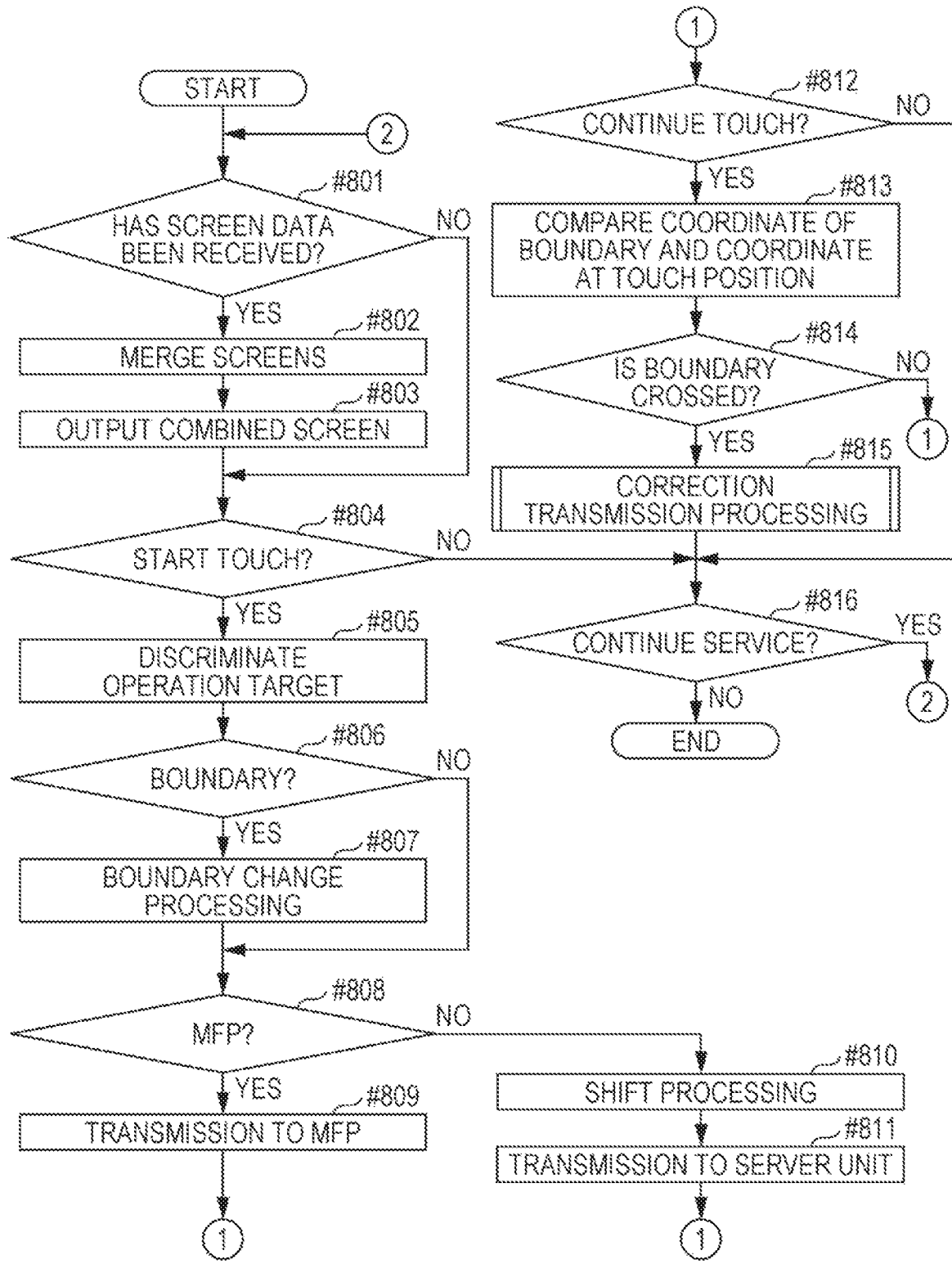
FIG. 15 is a flowchart illustrating an example of an overall process flow of a panel microcomputer.
Figure 16:
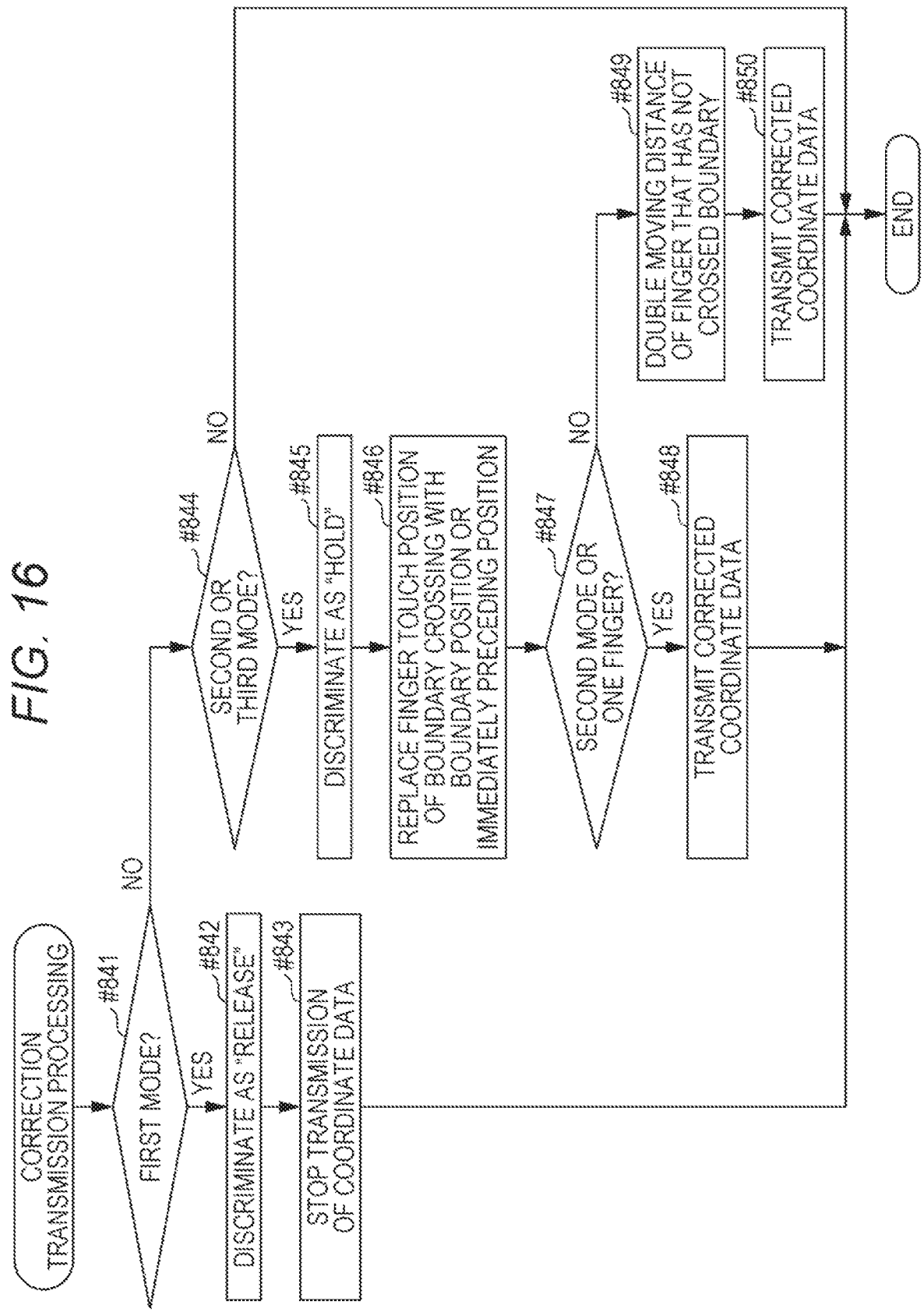
FIG. 16 is a flowchart illustrating an example of a correction transmission processing flow.

FIG. 14 is a flowchart illustrating an example of an overall processing flow of the MFP unit 2 or the server unit 3. FIG. 15 is a flowchart illustrating an example of an overall process flow of the panel microcomputer 5. FIG. 16 is a flowchart illustrating an example of a correction transmission processing flow.

Next, an example of the overall processing flow of each of the MFP unit 2, the server unit 3, and the panel microcomputer 5 will be described with reference to flowcharts.

After starting the operating system, the MFP unit 2 executes processing in a procedure illustrated in FIG. 14 on the basis of the screen output program 20P. After starting the operating system, the server unit 3 also executes processing in a procedure illustrated in FIG. 14 on the basis of the screen output program 30P.

After starting up the operating system, the panel microcomputer 5 executes processing in a procedure illustrated in FIG. 15 on the basis of the relay program 50P.

The MFP unit 2 generates the screen data 6A3 of a default display target portion of the default MFP screen 7A, that is, the desktop screen 7A1 (refer to FIG. 7) (#821 of FIG. 14) and starts transmission of the data to the panel microcomputer 5 (#822).

In a similar manner, the server unit 3 also generates the screen data 6B3 of a default display target portion of the default server screen 7B, that is, the desktop screen 7B1 (refer to FIG. 8) (#821), and starts transmission of the data to the panel microcomputer 5 (#822).

When the panel microcomputer 5 receives the screen data 6A3 and the screen data 6B3 from the MFP unit 2 and the server unit 3 (Yes in #801), the panel microcomputer 5 arranges the display target portion of each of the MFP screen 7A and the server screen 7B side by side to merge the screens to generate the combined screen 7C (refer to FIG. 10) on the basis of the screen data 6A3 and the screen data 6B3. (#802) Then, the combined screen 7C is displayed on the display module 4A (#803).

When the panel microcomputer 5 starts reception of the coordinate data 6E from the touch panel module 4B (Yes in #804), the panel microcomputer 5 discriminates an operation target (#805).

In a case where the target is discriminated to be the boundary 40D, that is, in a case where the operation is intended to move the boundary 40D (Yes in #806), the panel microcomputer 5 performs processing of moving the boundary 40D (#807). Specifically, the panel microcomputer 5 updates the boundary coordinate data 6D so that the X coordinate indicated in the last coordinate data 6E among the consecutively received coordinate data 6E becomes the X coordinate of the boundary 40D, and transmits the boundary change data 6F1 and 6F2 to the MFP unit 2 and the server unit 3, respectively.

Alternatively, in a case where the target is discriminated to be the MFP unit 2 (Yes in #808), the panel microcomputer 5 sequentially transmits the sequentially received coordinate data 6E to the MFP unit 2 (#809).

Alternatively, when the target is discriminated to be the server unit 3 (No in #808), the panel microcomputer 5 applies shift processing to the sequentially received coordinate data 6E and sequentially transmits the coordinate data 6E to the server unit 3 (#810, #811).

Note that while consecutively receiving the coordinate data 6E, the panel microcomputer 5 monitors the boundary crossing by comparing the coordinates indicated in the coordinate data 6E with the coordinates of the boundary 40D (#813).

In a case where the boundary crossing is detected (#814), the panel microcomputer 5 performs the processing illustrated in FIG. 16 (#815) in accordance with the set mode.

In a case where the first mode is set (Yes in #841 in FIG. 16), the panel microcomputer 5 judges that the finger is separated from the touch panel module 4B (#842), and stops transmission of the coordinate data 6E that is consecutively received after detection of boundary crossing (#843).

Alternatively, in a case where the second mode or the third mode is set (Yes in #844), the panel microcomputer 5 judges that the finger that has crossed the boundary 40D is held at a position where the finger overlaps the boundary 40D (#845). Subsequently, the panel microcomputer 5 corrects each of pieces of coordinate data 6E consecutively received after detection of boundary crossing so as to indicate coordinates of the position overlapping with the boundary 40D or the most recent coordinate crossing the boundary 40D, as the coordinates of the position of the finger (#846). In a case where the operation target is the server unit 3, the panel microcomputer 5 further applies shift processing on the coordinate data 6E.

Moreover, in a case where the second mode is set and simply one set of coordinates is indicated in each of the coordinate data 6E, that is, in a case where the touch is made with one finger (Yes in #847), the panel microcomputer 5 transmits the coordinate data 6E that has undergone correction or shift processing to the operation target of the MFP unit 2 and the server unit 3 (#848).

In a case where the third mode is set and a plurality of sets of coordinates is indicated in each of pieces of the coordinate data 6E (No in #847), the panel microcomputer 5 corrects the coordinate data 6E (#849) so as to double the moving distance of the finger that has not crossed the boundary 40D. In a case where the operation target is the server unit 3, the panel microcomputer 5 further applies shift processing on the coordinate data 6E.

The panel microcomputer 5 subsequently transmits the coordinate data 6E that has undergone correction or shift processing to the operation target of the MFP unit 2 and the server unit 3 (#850).

The panel microcomputer 5 appropriately executes the processing of steps #801 to #815 until the screen output program 20P is finished.

After receiving the coordinate data 6E from the panel microcomputer 5 (Yes in #823), the MFP unit 2 determines and executes the next processing (#824, #825).

Alternatively, after receiving the boundary change data 6F1 from the panel microcomputer 5 (Yes in #826), the MFP unit 2 changes the display target portion and generates screen data 6A3 of the changed display target portion (#827). Subsequently, the MFP unit 2 transmits the generated data to the panel microcomputer 5 (#828).

Similarly, after receiving the coordinate data 6E from the panel microcomputer 5 (Yes in #823), the server unit 3 also determines and executes the next processing (#824, #825). After receiving the boundary change data 6F2 from the panel microcomputer 5 (Yes in #826), the server unit 3 changes the display target portion, generates screen data 6B3 of the changed display target portion and transmits the generated data to the panel microcomputer 5 (#828).

The MFP unit 2 appropriately executes the processing of steps #821 to #829 until the screen output program 20P is finished. Similarly, the server unit 3 appropriately executes the processing of steps #821 to #829 until the screen output program 30P is finished.

According to the present embodiment, the user can perform operation for each of the MFP unit 2 and the server unit 3 by using a single touch panel display 4 in more desired manner.

Figure 18:
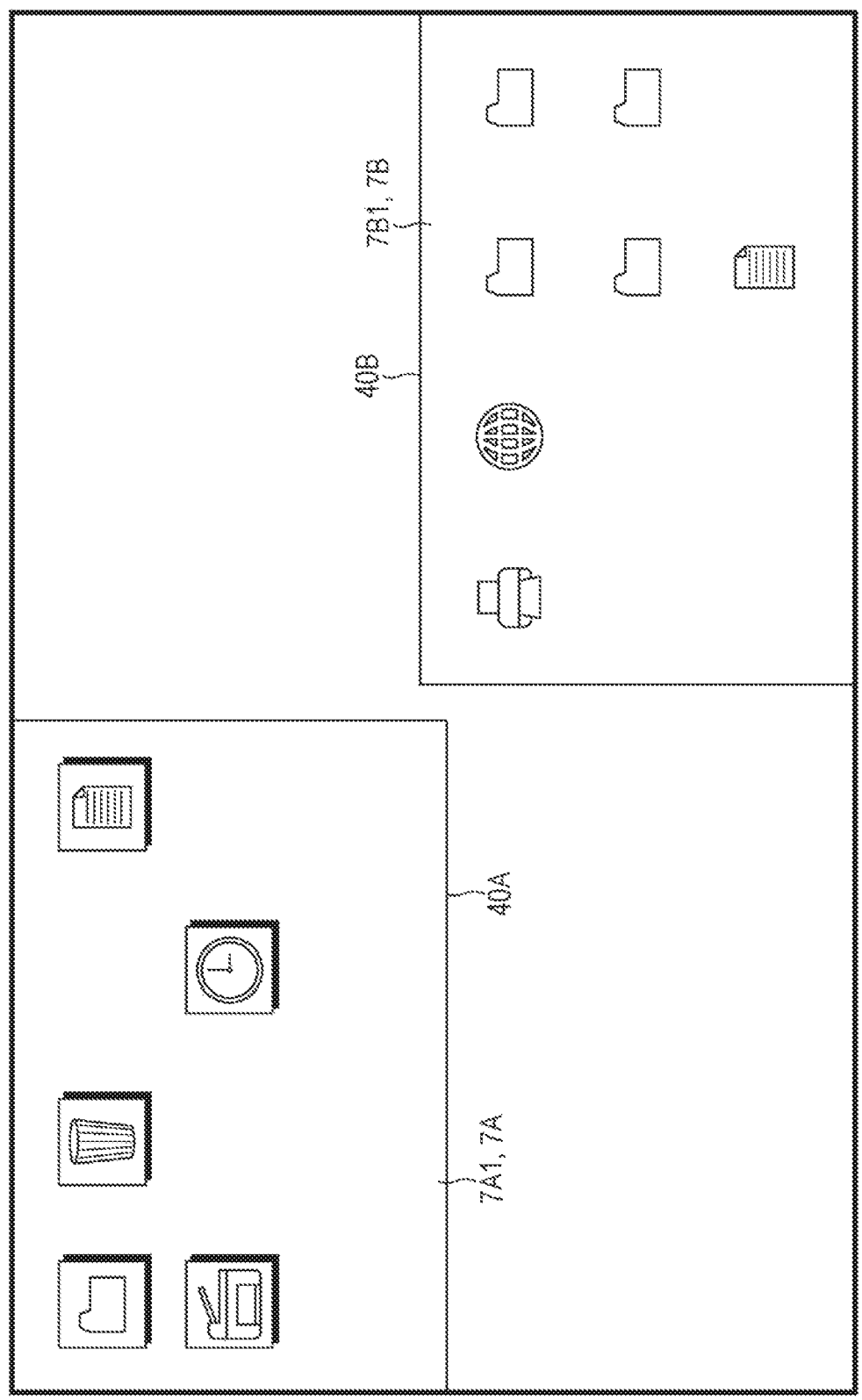
FIG. 18 is a diagram illustrating an example of each of regions of the MFP unit and the server unit.
Figure 19:
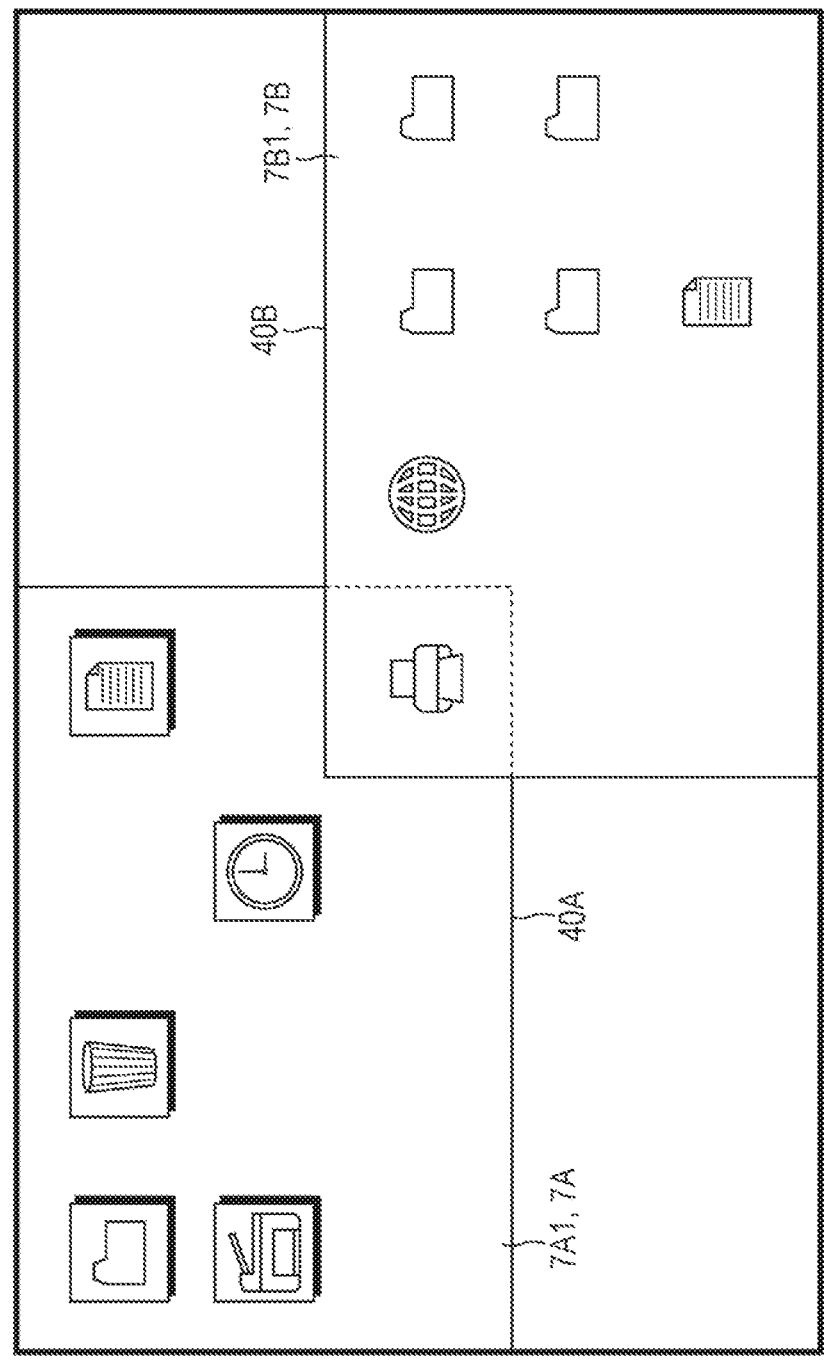
FIG. 19 is a diagram illustrating a modification of each of regions of the MFP unit and the server unit.

FIGS. 17A and 17B are diagrams respectively illustrating modifications of each of the coordinate data 6E at the time of input and output. FIG. 18 is a diagram illustrating an example of the regions 40A and 40B of the MFP unit 2 and the server unit 3, respectively. FIG. 19 is a diagram illustrating a modification of the regions 40A and 40B of the MFP unit 2 and the server unit 3, respectively.

In the present embodiment, in a case where the third mode is set and two fingers are being used for the touch, the first coordinate data transmitter 505 corrects the coordinate data 6E so as to indicate such that after one finger has crossed the boundary, the other finger is moving with double the speed of the actual speed. However, there might be a case where the user moves one finger alone and fixes the other finger with no movement at the time of pinch-out.

To handle this, in a case where the other finger is not moving, the first coordinate data transmitter 505 just corrects the coordinate data 6E so as to indicate such that after one finger has crossed the boundary, the coordinates corresponding to the other finger is moving with an inverse vector of the vector of the one finger. This similarly applies to the second coordinate data transmitter 506.

For example, in a case where the coordinate data 6E as illustrated in FIG. 17A has been received before and after the boundary crossing, the first coordinate data transmitter 505 rewrites the coordinates as illustrated in FIG. 17B and transmits the coordinate data 6E to the MFP unit 2.

In the present embodiment, the display surface 4AS and the touch surface 4BS are each divided into two on the boundary 40D. However, when the user performs operation of moving the boundary 40D to the right end of the display surface 4AS and the touch surface 4BS, the right region 40R has no width and the display surface 4AS and the touch surface 4BS substantially include the left region 40L alone. In a case where the boundary 40D is at the right end, the operation target discriminator 504 may immediately discriminate that the user's operation is operation for the MFP unit 2 unless the user's operation is operation for the boundary 40D. Similarly, in a case where the boundary 40D is at the left end, the operation target discriminator 504 may immediately discriminate that the user's operation is operation for the server unit 3 unless the user's operation is operation for the boundary 40D.

While the display surface 4AS and the touch surface 4BS are divided into the left and right by the boundary 40D in the present embodiment, the surfaces may be divided up and down. Alternatively, the surfaces may be divided into four in the vertical and horizontal directions. Alternatively, as illustrated in FIG. 18, the display surface 4AS and the touch surface 4BS may have a region 40A for the MFP screen 7A and a region 40B for the server screen 7B instead of the left region 40L and the right region 40R, respectively, and margins may be further provided. In this case, the boundary coordinate data 6D may be set so that an outline (outer frame) of each of the regions 40A and 40B is indicated as the boundary 40D. In a case where a touch is made on the margin, the panel microcomputer 5 discriminates that the user's operation is not operation for the boundary 40D, the MFP unit 2, or the server unit 3. In this case, the panel microcomputer 5 performs no processing in response to this touch.

Furthermore, the user may freely arrange the region 40A and the region 40B. This sometimes leads to a case, as illustrated in FIG. 19, where a portion of each of the regions 40A and 40B might overlap with each other. In this case, when the coordinates indicated in the coordinate data 6E received from the touch panel module 4B belong to a region formed by overlapping (overlapping region), the panel microcomputer 5 discriminates the user's operation is operation for the upper side region among the region 40A and the region 40B. For example, when a portion of the region 40A overlaps on a portion of the region 40B, and the coordinates indicated by the coordinate data 6E are present in the overlapping region, the panel microcomputer 5 discriminates that the operation is operation for the MFP unit 2. In a case where the coordinates indicated in the coordinate data 6E belong to the margin, the panel microcomputer 5 discriminates, as described above, that this operation is no operation for any of the boundary 40D, the MFP unit 2, or the server unit 3.

In the present embodiment, the case where one user uses both the MFP unit 2 and the server unit 3 has been described as an example. It is also possible, however, for different users to use each of the MFP unit 2 and the server unit 3.

Processing by the panel microcomputer 5 in case of this will be described by using an example in which a first user and a second user use each of the MFP unit 2 and the server unit 3 respectively. In this example, it is assumed that both the first user and the second user touches with one finger alone. Furthermore, it is assumed that the first user starts to touch first.

The panel microcomputer 5 receives data indicating one set of coordinates or data indicating two sets of coordinates as the coordinate data 6E.

First, when the data indicating one set of coordinates is first received as the coordinate data 6E, the operation target discriminator 504 discriminates that the user's operation (here, the first user's operation) is operation for the MFP unit 2.

The first coordinate data transmitter 505 transmits the coordinate data 6E to the MFP unit 2 and transmits the coordinate data 6E consecutively received following the coordinate data 6E, to the MFP unit 2. However, in a case where two sets of coordinates are indicated in the coordinate data 6E, the first coordinate data transmitter 505*a* selects the coordinates corresponding to the position touched by the first user, and transmits data indicating the selected coordinates alone out of the two sets of coordinates (hereinafter referred to as "coordinate data 6Ea") as the coordinate data 6E.

Furthermore, in a case where the selected coordinates has crossed the boundary 40D, the first coordinate data transmitter 505 judges that the finger is held and then corrects and transmits the coordinate data 6Ea, or judges that the finger is released and then stops transmission of the coordinate data 6Ea, in accordance with the set mode, as in the present embodiment. Alternatively, in a case where a fourth mode is set, the coordinate data 6Ea may be transmitted without being corrected.

Meanwhile, the second coordinate data transmitter 506 performs shift processing on data (hereinafter referred to as "coordinate data 6Eb") indicating the unselected coordinates among the two coordinates, and outputs the data as the coordinate data 6E to the server unit 3.

Thereafter, in a case where the unselected coordinates has crossed the boundary 40D, the second coordinate data transmitter 506 corrects and transmits the coordinate data 6Eb or stops transmission of the coordinate data 6Eb, in accordance with the set mode as in the present embodiment.

Alternatively, in a case where a fourth mode is set, the coordinate data 6Eb may be transmitted without being corrected.

While the present embodiment describes the processing performed when simply one finger crosses the boundary 40D in a case where touch is made with two fingers, it is also allowable that, in a case where both fingers have crossed the boundary 40D, the first coordinate data transmitter 505 and the second coordinate data transmitter 506 may cancel transmitting the coordinate data 6E. Alternatively, in a case where three finger touch is present, it is allowable to judge that this is release operation and cancel transmission of the coordinate data 6E.

In the present embodiment, the MFP unit 2 generates the screen data 6A3 of the display target portion of the MFP screen 7A, while the server unit 3 generates the screen data 6B3 of the display target portion of the server screen 7B. Alternatively, however, the panel microcomputer 5 may receive the entire screen data of the MFP screen 7A from the MFP unit 2 and may generate the screen data 6A3 of the display target portion. Similarly, the panel microcomputer 5 may receive the entire screen data of the server screen 7B from the server unit 3 and may generate the screen data 6B3 of the display target portion.

While the present embodiment is an example in which the panel microcomputer 5 executes the shift processing for the coordinate data 6E, the server unit 3 may execute the shift processing.

While the present embodiment is an exemplary case where the touch panel module 4B is touched with one or two fingers, the touch may be performed with one or two touch pens or the like.

In addition, it is possible to appropriately change the configuration of the whole or each of portions of the multifunctional machine 1, the MFP unit 2, the server unit 3, the details of the processing, the order of the processing, the composition of the data, the configuration of the screen, etc. in accordance with the scope and spirit of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. A touch panel sharing support apparatus applicable for sharing a touch panel by a first system and a second system independent of each other, the touch panel sharing support apparatus comprising:
   a storage that stores definition data defining a first region for the first system and a second region for the second system, on a touch surface of the touch panel;
   a hardware processor that discriminates which of the first region and the second region a touched position on the touch surface belongs to on the basis of the definition data; and
   a transmitter that transmits operation data concerning an operation onto the touch surface to the first system in a case where the hardware processor discriminates that the position belongs to the first region and transmits the operation data to the second system in a case where the hardware processor discriminates that the position belongs to the second region;
   wherein in a case where the touch surface is being touched simultaneously by two objects, the transmitter stops transmission of the operation data to the first system and cancels transmission of the operation data to the second system even when a start position is within the first region and even when a position inside the second region is seamlessly touched by one of the two objects across a boundary of the first region and the second region after a position inside the first region is touched, and stops transmission of the operation data to the second system and cancels transmission of the operation data to the first system even when the start position is within the second region and even when a position inside the first region is seamlessly touched by the one of the two objects across the boundary after a position inside the second region is touched.

2. A touch panel sharing support apparatus applicable for sharing a touch panel by a first system and a second system independent of each other, the touch panel sharing support apparatus comprising
   a transmitter that transmits operation data concerning an operation onto a touch surface to the first system during time of touch operation being made at a position within a first region for the first system on the touch surface in a case where a start position being a position at which a touch to the touch surface of the touch panel is started is within the first region, and transmits the operation data to the second system during time of touch operation being made at a position within a second region for the second system on the touch surface in a case where the start position is within the second region;
   wherein in a case where the touch surface is being touched simultaneously by two objects, the transmitter stops transmission of the operation data to the first system and cancels transmission of the operation data to the second system even when the start position is within the first region and even when a position inside the second region is seamlessly touched by one of the two objects across a boundary of the first region and the second region after a position inside the first region is touched, and stops transmission of the operation data to the second system and cancels transmission of the operation data to the first system even when the start position is within the second region and even when a position inside the first region is seamlessly touched by the one of the two objects across the boundary after a position inside the second region is touched.

3. The touch panel sharing support apparatus according to claim 2, comprising
   a display controller that controls to display a first screen being a screen of the first system and a second screen being a screen of the second system, on a display surface of a display,
   wherein the touch panel together with the display constitutes a touch panel display, and
   the display controller controls to display the first screen on a first portion of the display surface corresponding to the first region and controls to display the second screen on a second portion of the display surface corresponding to the second region.

4. The touch panel sharing support apparatus according to claim 3,
   wherein the display controller controls to display a screen generated in accordance with a first size of the first region by the first system, as the first screen, and controls to display a screen generated in accordance with a second size of the second region by the second system, as the second screen.

5. The touch panel sharing support apparatus according to claim 4, comprising:

a storage that stores definition data for defining each of the first region and the second region; and an update processor that updates the definition data stored in the storage on the basis of a touched position on the touch surface after the start position is touched in a case where the start position is an outline of the first region or an outline of the second region, notifies the first system of a size of the first region changed with the update of the definition data as the first size, and notifies the second system of a size of the second region as the second size, wherein the display controller controls to display a screen re-generated by the first system in accordance with the notified first size, as the first screen, and controls to display a screen re-generated by the second system in accordance with the notified second size, as the second screen.

6. The touch panel sharing support apparatus according to claim 2, wherein the touch panel periodically detects the touched position on the touch surface, and the transmitter transmits data based on the detected position as the operation data every time the touched position on the touch surface is detected by the touch panel.

7. The touch panel sharing support apparatus according to claim 6, wherein the transmitter stops transmission of the operation data in a case where the start position is within the first region and when a position outside the first region is touched seamlessly after a position inside the first region is touched, and stops transmission of the operation data in a case where the start position is within the second region and when a position outside the second region is touched seamlessly after a position inside the second region is touched.

8. The touch panel sharing support apparatus according to claim 7, wherein the first region and the second region are adjacent to each other, and the transmitter cancels transmission of the operation data to the second system even when a position inside the second region is seamlessly touched across a boundary of the first region and the second region after a position inside the first region is touched in a case where the start position is within the first region, and cancels transmission of the operation data to the first system even when a position inside the first region is seamlessly touched across the boundary after a position inside the second region is touched in a case where the start position is within the second region.

9. The touch panel sharing support apparatus according to claim 6, wherein in a case where the start position is inside the first region and when a position inside the first region is first touched and then a position outside the first region is seamlessly touched, and thereafter, the transmitter transmits data based on a position before the position outside the first region is touched to the first system as the operation data instead of transmitting data based on the touched position outside the first region, and in a case where the start position is inside the second region and when a position inside the second region is first touched and then a position outside the second region is seamlessly touched, and thereafter, the transmitter transmits data based on a position before the position outside the second region is touched to the second system as the operation data instead of transmitting data based on the touched position outside the second region.

10. The touch panel sharing support apparatus according to claim 6, wherein in a case where a position inside the first region and a position inside the second region are simultaneously touched by the first object and the second object, respectively, the transmitter transmits, as the operation data, data concerning operation performed by the first object to the first system and transmits data concerning operation performed by the second object to the second system.

11. The touch panel sharing support apparatus according to claim 6, wherein in a case where a position inside the first region and a position inside the second region are touched simultaneously by a first object and a second object, respectively, the transmitter transmits data based on the position touched by the first object to the first system as the operation data and cancels transmission of the data to the second system even when a position outside the first region is seamlessly touched after the position inside the first region is touched by the first object, and the transmitter transmits data based on the position touched by the second object to the second system as the operation data and cancels transmission of the data to the first system even when a position outside the second region is seamlessly touched after the position inside the second region is touched by the second object.

12. A touch panel sharing support apparatus applicable for sharing a touch panel by a first system and a second system independent of each other, the touch panel sharing support apparatus comprising a transmitter that transmits operation data concerning an operation onto a touch surface to the first system during time of touch operation being made at a position within a first region for the first system on the touch surface in a case where a start position being a position at which a touch to the touch surface of the touch panel is started is within the first region, and transmits the operation data to the second system during time of touch operation being made at a position within a second region for the second system on the touch surface in a case where the start position is within the second region;

wherein in a case where the touch surface is being touched simultaneously by two objects and when the start position is within the first region and when a position outside the first region is seamlessly touched by one of the two objects after a position inside the first region is touched, the transmitter transmits, as the operation data, data based on a position before the position outside the first region is touched and based on a position being touched by the other of the two objects, and when the start position is within the second region and when a position outside the second region is seamlessly touched by the one of the two objects after a position inside the second region is touched, the transmitter transmits, as the operation data, data based on a position before the position outside the second region is touched and based on a position being touched by the other of the two objects.

13. The touch panel sharing support apparatus according to claim 12, wherein in a case where the touch surface is being touched simultaneously by two objects and when the start position is within the first region and when a position outside the first region is seamlessly touched by one of the two objects after a position inside the first region is touched, the transmitter transmits, as the operation data, data based on a position before the position outside the first region is touched and based on a position of the other of the two objects when the other moves on the touch surface in a double speed, and when the start position is within second region and when a position outside the second region is seamlessly touched by the one of the two objects after a position inside the second region is touched, the transmitter transmits, as the operation data, data based on the position before a position outside the second region is touched and based on a position of the other of the two objects when the other moves on the touch surface in a double speed.

14. The touch panel sharing support apparatus according to claim 12,
wherein in a case where the touch surface is being touched simultaneously by two objects and when the start position is within the first region and when a position outside the first region is seamlessly touched by one of the two objects after a position inside the first region is touched, the transmitter transmits, as the operation data, data based on a position before the position outside the first region is touched and based on a position of the other of the two objects when the other moves on the touch surface with an inverse vector of the movement of the one of the two objects, and when the start position is within second region and when a position outside the second region is seamlessly touched by the one of the two objects after a position inside the second region is touched, the transmitter transmits, as the operation data, data based on the position before a position outside the second region is touched and based on a position of the other of the two objects when the other of the two objects moves on the touch surface with an inverse vector of the movement of the one.

15. A touch panel sharing method of sharing a touch panel by a first system and a second system independent of each other, the touch panel sharing method comprising:
storing definition data defining a first region for the first system and a second region for the second system on a touch surface of the touch panel, in a storage;
discriminating which of the first region and the second region a touched position on the touch surface belongs to on the basis of the definition data; and
transmitting operation data concerning an operation onto the touch surface to the first system in a case where discrimination is made to the effect that the position belongs to the first region and transmits the operation data to the second system in a case where discrimination is made to the effect that the position belongs to the second region;
wherein in a case where the touch surface is being touched simultaneously by two objects, the transmitter stops transmission of the operation data to the first system and cancels transmission of the operation data to the second system even when a start position is within the first region and even when a position inside the second region is seamlessly touched by one of the two objects across a boundary of the first region and the second region after a position inside the first region is touched, and stops transmission of the operation data to the second system and cancels transmission of the operation data to the first system even when the start position is within the second region and even when a position inside the first region is seamlessly touched by the one of the two objects across the boundary after a position inside the second region is touched.

16. A touch panel sharing method of sharing a touch panel by a first system and a second system independent of each other, the touch panel sharing method comprising:
transmitting operation data concerning an operation onto a touch surface to the first system during time of touch operation being made at a position within a first region for the first system on the touch surface in a case where a start position being a position at which a touch to the touch surface of the touch panel is started is within the first region; and
transmitting operation data to the second system during time of touch operation being made at a position within a second region for the second system on the touch surface in a case where the start position is within the second region;
wherein in a case where the touch surface is being touched simultaneously by two objects, the transmitter stops transmission of the operation data to the first system and cancels transmission of the operation data to the second system even when the start position is within the first region and even when a position inside the second region is seamlessly touched by one of the two objects across a boundary of the first region and the second region after a position inside the first region is touched, and stops transmission of the operation data to the second system and cancels transmission of the operation data to the first system even when the start position is within the second region and even when a position inside the first region is seamlessly touched by the one of the two objects across the boundary after a position inside the second region is touched.

17. A non-transitory recording medium storing a computer readable program used in a computer sharing a touch panel by a first system and a second system independent of each other, the computer program causing the computer to perform:
discriminating which of a first region for the first system and a second region for the second system a touched position on the touch surface of the touch panel belongs to on the basis of the definition data defining the first region and the second region stored in a storage; and
transmitting operation data concerning an operation onto the touch surface to the first system in a case where discrimination is made to the effect that the position belongs to the first region and transmitting the operation data to the second system in a case where discrimination is made to the effect that the position belongs to the second region;
wherein in a case where the touch surface is being touched simultaneously by two objects, the transmitter stops transmission of the operation data to the first system and cancels transmission of the operation data to the second system even when a start position is within the first region and even when a position inside the second region is seamlessly touched by one of the two objects across a boundary of the first region and the second region after a position inside the first region is touched, and stops transmission of the operation data to the second system and cancels transmission of the operation data to the first system even when the start position is within the second region and even when a position inside the first region is seamlessly touched by the one of the two objects across the boundary after a position inside the second region is touched.

18. A non-transitory recording medium storing a computer readable program used in a computer sharing a touch panel by a first system and a second system independent of each other, the computer program causing the computer to perform:
- transmitting operation data concerning an operation onto a touch surface to the first system during time of touch operation being made at a position within a first region for the first system on the touch surface in a case where a start position being a position at which a touch to the touch surface of the touch panel is started is within the first region; and
- transmitting the operation data to the second system during time of touch operation being made at a position within a second region for the second system on the touch surface in a case where the start position is within the second region;

wherein in a case where the touch surface is being touched simultaneously by two objects, the transmitter stops transmission of the operation data to the first system and cancels transmission of the operation data to the second system even when the start position is within the first region and even when a position inside the second region is seamlessly touched by one of the two objects across a boundary of the first region and the second region after a position inside the first region is touched, and stops transmission of the operation data to the second system and cancels transmission of the operation data to the first system even when the start position is within the second region and even when a position inside the first region is seamlessly touched by the one of the two objects across the boundary after a position inside the second region is touched.

* * * * *